US006098647A

United States Patent [19]

Häussler et al.

[11] Patent Number: 6,098,647

[45] Date of Patent: Aug. 8, 2000

[54] LOAD-HOLDING BRAKE VALVE

[75] Inventors: Hubert Häussler; Ivan Hristov, both of Neuheim; Hans Staiger, Cham; Josef Zürcher, Neuheim, all of Switzerland

[73] Assignee: Beringer-Hydraulik AG, Switzerland

[21] Appl. No.: 09/125,977

[22] PCT Filed: Feb. 28, 1997

[86] PCT No.: PCT/EP97/00992

§ 371 Date: Aug. 28, 1998

§ 102(e) Date: Aug. 28, 1998

[87] PCT Pub. No.: WO97/32136

PCT Pub. Date: Sep. 4, 1997

[30] Foreign Application Priority Data

| | | | |
|---|---|---|---|
| Feb. 28, 1996 | [DE] | Germany | 196 07 452 |
| Nov. 30, 1996 | [DE] | Germany | 196 49 752 |

[51] Int. Cl.[7] .............................. G05D 7/00; F16K 31/12; F15B 11/08

[52] U.S. Cl. .............................. 137/102; 251/38; 91/445; 91/468

[58] Field of Search .............................. 91/420, 445, 468; 137/102; 251/38

[56] References Cited

U.S. PATENT DOCUMENTS

| | | | |
|---|---|---|---|
| 2,588,520 | 3/1952 | Halgren et al. . | |
| 2,653,626 | 9/1953 | Finlayson | 91/420 X |
| 2,732,851 | 1/1956 | Ashley et al. | 137/102 |
| 3,857,404 | 12/1974 | Johnson | 91/420 X |
| 3,906,991 | 9/1975 | Haussler | 91/420 X |
| 3,975,987 | 8/1976 | Panis . | |
| 4,024,884 | 5/1977 | Prescott et al. | 251/38 |
| 4,132,153 | 1/1979 | Grotness et al. | 91/405 |
| 4,176,688 | 12/1979 | Schwerin | 251/38 X |
| 4,240,255 | 12/1980 | Benilan | 91/420 X |
| 4,338,856 | 7/1982 | Smilges et al. . | |
| 4,397,221 | 8/1983 | Friesen et al. | 91/420 |
| 4,418,612 | 12/1983 | Nanda | 251/38 X |
| 4,562,862 | 1/1986 | Mucheyer et al. | 251/38 X |
| 4,597,557 | 7/1986 | Krieger et al. | 91/420 X |
| 4,624,445 | 11/1986 | Putnam | 91/420 X |
| 4,708,184 | 11/1987 | Pechar | 137/102 X |
| 5,191,826 | 3/1993 | Brunner . | |

FOREIGN PATENT DOCUMENTS

| | | |
|---|---|---|
| 0 042 929 | 1/1982 | European Pat. Off. . |
| 0 066 151 | 12/1982 | European Pat. Off. . |
| 0 464 305 | 1/1992 | European Pat. Off. . |
| 1288529 | 12/1962 | France . |
| 2 236 100 | 1/1975 | France . |
| 2 387 395 | 11/1978 | France . |
| 2 429 345 | 1/1980 | France . |
| 2 214 245 | 10/1973 | Germany . |
| 37 06 387 | 9/1988 | Germany . |
| 543 028 | 11/1973 | Switzerland . |

*Primary Examiner*—John E. Ryznic
*Attorney, Agent, or Firm*—Burns, Doane, Swecker & Mathis

[57] ABSTRACT

A hydraulically controllable valve for double-acting consumers that in the lowering mode drains off a flow of load volume from connection B to connection A in throttled fashion. To that end, the valve has a valve seat (5), which communicates with a sealing face (4) of a main piston (3). A pilot piston (8) is guided concentrically in the main piston (3) and communicates with a sealing face (7) to a pilot valve seat (6) in the main piston; the main piston (3) and the pilot piston (8) are held on the valve seat (5) and pilot valve seat (6), respectively, by the load pressure and/or by spring force. On the pressure-relieved side, the pilot piston (8) has a piston shank (9), guided in a seat bore, with a continuously decreasing throttling action and in particular throttle grooves (10), which form a throttle restriction. On hydraulic triggering, the pilot piston (8) is axially displaceable by means of an opening piston (20), so that the pilot valve (5, 6) opens, and a load volume flow flows out of a pilot chamber (15), receiving the springs, via the throttle restriction. The resultant load pressure reduction causes an axial displacement of the main piston (3) and the opening of the valve seat. An additional damping valve assembly reduces incident vibration of the load. A pressure limiting valve, independent of the return pressure, is integrated in the load-holding brake valve housing.

18 Claims, 10 Drawing Sheets

LOAD-HOLDING BRAKE VALVE

Figure 1:
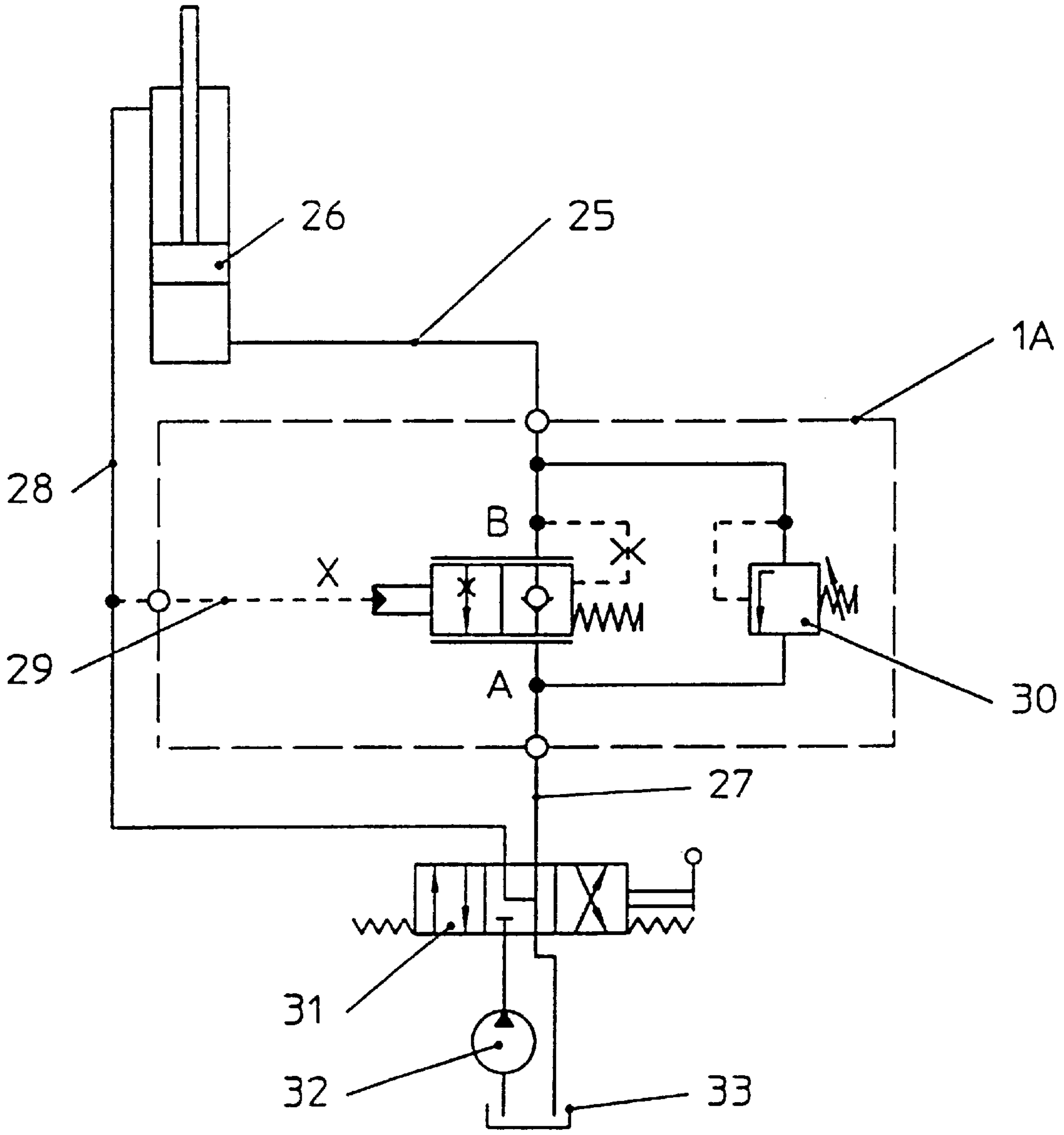

The invention relates to a hydraulically controllable load-holding brake valve for double-acting consumers as generically defined by the preamble to claim 1.

This valve is known from Swiss Patent CH 54 30 28. The load-holding brake valve has as its pilot valve a ball seat valve which requires very sensitive control by the opening piston in order to enable a constant increase in flow from the very onset and to avoid an abrupt opening action.

It is therefore the object of the invention to embody a load-holding brake valve of the type referred to above in such a way that very sensitive pressure relief of the main piston is effected without an abrupt rise in volumetric flow. If a progressive opening action of the valve is to be attained, the reduction in the load volume flow must be effected very uniformly and steadily.

The term "progressive opening action" is understood here to mean that the opening is essentially proportional to the control pressure, but in any case there is a defined dependency, free of bumping and jarring, between the opening cross section and the control pressure (in other words, the first and second derivations of the function "opening of the valve via the control pressure" are finite and steady for every variation in the control pressure).

This object is attained by a load-holding brake valve as defined by the characteristics of claim 1.

The pilot piston, adjacent to its sealing face, has a piston shank (pilot tappet), which is guided with slight play in the seat bore. The piston shank has a succession of a plurality of cross-sectional regions over the course of its length. The maximal cross section follows and corresponds to the seat cross section. It has essentially only a very slight play relative to the seat bore (pilot conduit). The region of maximal cross section is very short and can tend toward zero.

This is followed by the throttling region. By means of it, the valve tappet forms a throttle restriction in the seat bore (pilot conduit), the throttling action of which restriction becomes steadily—and preferably progressively—less upon displacement of the tappet and/or the resultant emergence from the pilot conduit. At a point in the throttling region, preferably already shortly after the pilot piston lifts away from its seat, the throttling action is so great that it is substantially greater than the throttle action of the compensation throttle. From then on, the throttling action relative to the pilot conduit drops, with an increasing opening travel of the opening piston and displacement of the pilot tappet, in such a way that the function of the throttling action is steady over the displacement length of the pilot tappet. The throttling action preferably initially drops only slightly and then ever more markedly with an increasing displacement path; the length and cross section of the tappet are accordingly adapted in such a way that the tappet and the pilot conduit of the main piston, at the onset of opening of the pilot piston, forms a very small throttling gap, whose throttling action is substantially greater than that of the compensation throttle, and then until the minimal cross section is reached forms a steadily larger throttling gap, whose throttling action decreases steadily and preferably more and more with the length of motion of the pilot tappet and the opening piston, so that the closing forces acting on the main piston drop. This is attained by the special embodiment of the throttle bore in terms of its length and cross section. In particular, two designs of the cross section are possible:

In the first embodiment, the cross section begins at the maximal cross section and then drops steadily over its length until reaching the minimal cross section. The decreasing throttling action is attained in that the throttling gap of the pilot tappet relative to the pilot conduit wall increases steadily, beginning at the throttling gap of the maximal cross section.

In the second embodiment, the cross section again begins at the maximal cross section; it then decreases over a first partial length, up to a cross section that is larger than the minimal cross section; over a further partial length, this cross section remains the same. Here the decreasing throttling action is attained in that the length of the throttling gap of the pilot tappet dipping into the pilot conduit decreases steadily with displacement of the pilot tappet. Combinations of the two versions are also conceivable.

The steady reduction in the cross section of the tappet in the throttling region, that is, the decrease in throttling action of the tappet relative to the pilot conduit, can be attained for instance in that the tappet in the region of reduced cross section is a rotary body, whose diameter decreases slightly conically or—preferably—progressively over its length, or in other words decreases parabolically or hyperbolically. It would also be possible to embody the region of decreasing cross section cylindrically, with the diameter of the region of maximal cross section, but in the region of the decreasing cross section to provide a chamfer or flattened face or axially oriented throttle grooves of variable depth and width, which begin at the region of maximal cross section and terminate at the circumference of the region having the least cross section. To attain a progressive reduction in cross section, the depth, or in addition or alternatively the width as well, of these chamfers or throttle grooves can increase parabolically or hyperbolically.

Preferably, the length of the throttling region is adapted to the variation in the closing forces acting on the main piston. These closing forces are composed of the hydraulic forces and the spring forces acting on the main piston.

This adaptation is accomplished such that the tappet and the pilot conduit of the main piston, at the onset of opening of the pilot piston, form a very small throttling gap, whose throttling action is greater than the throttling action of the compensation throttle, and then form a steadily increasing throttling gap until the minimal cross section is reached; with the length of motion of the pilot tappet and the opening piston, the throttling action drops to a more pronounced extent than that by which the closing forces acting on the opening piston increase. In the embodiment of the valve with a spring acting directly on the main piston, the length of the throttling region is accordingly inversely proportional to the spring stiffness of the springs acting on the main piston in the closing direction. It is attained by means of this embodiment that after the opening of the pilot valve, the pressure reduction in the pilot chamber ensues slowly and as a function of the length of the tappet and the length of motion of the opening piston or pilot tappet, on the one hand, and as a function of the hydraulically effective embodiment of the main piston and the spring stiffness of the springs that urge the main piston in the closing direction, on the other. The greater the stiffness of these springs, the shorter is the tappet and its throttling region. In other words, the more markedly the spring force on the main piston increases upon opening, the more markedly must the throttling action of the pilot tappet in the pilot conduit drop in the course of the motion of the pilot tappet.

The result is thus is a stable position of equilibrium of the main piston for every opening pressure. This also prevents a sudden, jerking and abrupt opening or motion of the load-holding brake valve piston. The opening characteristic and the adaptation of the tappet length on the one hand and of the springs on the other furthermore prevent the inducement of vibration of the moving loads.

The pressure drop in the pilot chamber is effected steadily and with a defined dependency on the control pressure and the attendant motion of the opening piston. The main piston is prevented from leading ahead of the pilot piston or executing uncontrolled and uncontrollable movements.

The result is a hydraulic follow-up system with that functions with precision. As soon as the load pressure downstream of the main piston is reduced, the main piston automatically follows the pilot piston, since the load pressure that acts on the resultant annular face of the main piston displaces the main piston out of its valve seat. Since the main piston follows the pilot piston displaced by the opening piston, the opening cross section in the pilot valve seat will narrow again, so that once again a counterpressure can build up in the pilot chamber of the main piston. A position of equilibrium thus ensues between the opening piston and the pilot piston on the one hand and the main piston on the other. The advantage of this principle is that the fluid force acting in the closing direction is less, because of the hydraulic force amplification attained under all conditions, than the hydraulic opening force. This prevents pressure fluctuations in the consumer connection B from tripping undesired motions of the main piston. This can prevent the buildup of vibration in a cantilevered arm in a hydraulic dredger or crane.

The maximal cross section of the pilot tappet relative to the cross section of the pilot conduit is embodied such that the throttling cross section, after opening of the pilot valve seat, is initially only insignificantly smaller than the throttling cross section of the compensation throttle, so that when the main piston lifts from the seat, a slow pressure reduction can take place in the pilot chamber. By means of the design of the region of maximal cross section and the adjoining region of reduced cross section, various opening characteristics can be realized, in particular including an opening action that is linear to the control pressure and linear to the motion of the opening piston.

All in all, the load-holding brake valve of the invention integrates the functions of load holding, load lowering, load raising, and load securing in a valve housing of very compact design. It is attained that given a suitably designed course of the throttling cross section, a hydraulic force acts constantly on the pilot piston, so that this piston or the tappet cannot lift away from the opening piston despite the pressure drop on the spring side of the pilot piston.

In the state of load raising, the spring-loaded main piston moreover takes on the function of a check valve. The low opening pressure of the check valve is made possible by a large seat area. Because of the high area ratio between the active diameter of the valve seat and the active diameter of the pilot valve seat, it is attained that the pilot piston does not open.

The invention permits fine graduation of the various throttle restrictions that are formed in the valve or are present there. In the embodiment of the valve according to claim 1, the control pressure is largely independent of the load pressure to be controlled, so that even with a low control pressure a further control region and sensitive control are made possible.

By the embodiment of claim 1, it is attained that the opening of the valve seat, which because of the size of the valve seat diameter leads to an only imprecisely definable throttling, has no negative effect on the opening action of the valve.

The embodiment of claim 1 assures that the opening even with a low control pressure already leads to a reaction of the valve and to a motion of the load.

According to the invention, it is possible to guide the opening and closing motion of the main piston solely hydraulically, since on both sides of the main piston, because of the fine adaptation of the throttle restrictions, definable hydraulic states always prevail.

To increase the closing action, the embodiment of claim 1 is used, in which for safety, preferably two parallel-connected springs can be provided. Of these springs, one may act only on the main control piston but the other can act on the pilot piston and thus indirectly on the main piston as well. Because of the sensitive pilot control of the main piston, it is advantageously also possible for only the pilot piston to be loaded with a spring in the closing direction, a spring that at the same time also acts in the closing direction on the main piston.

With regard to the embodiment of the prethrottle bore in the guide shank, there is extensive freedom of design, depending on the desired action. For instance, the cross section of the prethrottle bore may be greater than, equal to, or smaller than the flow cross section of the compensating throttle between the pilot chamber and the annular chamber.

The version according to claim 3 is advantageous if the control pressure is specified independently of the inflow pressure. Stepping the pilot piston and preceding it with a pilot throttle causes a higher closing pressure to act on the pilot piston. Particularly in open systems with external triggering, the flow from B to A when the load pressure is rising can thus be reduced. The reaction of the valve is damped, so that in particular, irregularities or vibrations of the load, or irregularities in the triggering, cannot cause valve vibration.

Because the opening piston and the pilot piston are guided independently of one another, errors of alignment between the opening piston and the pilot piston remain without effect.

In the load-holding brake valve of claim 4, a pressure limiting valve for securing the load pressure is integrated into the valve housing. Moreover, the highest load pressure can be adjusted in a simple way.

It is expedient to make provisions for reducing the spring load on the pressure limiting piston. This goal is attained by providing that the pressure limiting piston has only a small active area that is acted upon by the load pressure. The requisite spring force is thereby sharply reduced, and the installation space required is lessened.

Claim 5 discloses such an embodiment.

For safety reasons, two compression springs engage the pressure limiting piston; although they are connected parallel, nevertheless to save space they are disposed in accordance with claim 6.

In the version of the load-holding brake valve of one of claims 4–6, the opening pressure of the pressure limiting valve is also independent of the return pressure. As a result of this principle of the pressure limiting valve, it is attained that in a pressure limiting valve downstream of the multiway valve, the adjusting pressures are not added together.

The load—holding and brake valve according to this invention has—as already noted—an opening piston, with which the actuation of the pilot piston is done hydraulically-mechanically. This kind of hydraulic-mechanical actuation of valves often occurs in hydraulics, for instance in the hydraulic actuation of regulating valves. This hydraulic triggering has the disadvantage that opening of the trigger valve leads to a—more or less rapid—increase in the triggering oil quantity. It therefore depends on the attentiveness and skill of the human operator to assure that the trigger valve, on reaching a desired triggering oil quantity, or in other words on the attainment of a certain position of the hydraulically-mechanically triggered valve, is held in that position.

A further object of this invention is to bring this valve, like any other hydraulically-mechanically triggered valve, into a predetermined terminal position. Such an embodiment is disclosed in claim 7.

Such metering valves can be based on a hydraulic operating principle, for instance by metering predetermined oil quantities that are then supplied as control oil to the opening piston.

However, that would require adapting the oil quantity to be metered in a given case to the desired travel of the opening piston. This adaptation is accomplished automatically in the version of the valve of claim 8.

The closing element may be contacted mechanically with the opening piston in an arbitrary way, so that when a predetermined position of the opening piston is reached, the delivery of any further opening oil stream is discontinued.

An integration of the metering valve into the opening device that is advantageous both hydraulically and mechanically is disclosed in claim 9. In this version, an easily accessible and easily controlled option for adjusting the metering quantity is disclosed in claim 10. Moreover, in this case emergency actuation of the opening piston is desired and is attained by the provisions of claims 11, 13 and 13. As a result, on the one hand a mechanical actuation of the opening piston if the control pressure fails is attained, and on the other, a complete preclusion of triggerability of the opening piston is accomplished. Both functions may be needed for safety reasons.

Claim 14 discloses a simple option for pressure relief of the closing element.

Claim 15 describes more detailed embodiment possibilities.

Thus by these embodiments, on the one hand a stroke limitation for opening and on the other the option of mechanical unlocking, particularly in the form of an emergency function, are made possible.

The stroke limitation is very often not the desired terminal position of the opening piston and of the valve actuated thereby but rather merely a position from which the terminal position is to be approached. This is particularly the case when loads are being lowered. Then the essential distance should be traversed at high speed, but the terminal position should be approached slowly, at a crawl.

Claim 16 embodies the valve of claims 7–15 accordingly. In this embodiment, the high-speed mode can be activated very suddenly, by operating the valve in the open state of the metering valve. Once the terminal stroke of the metering valve is reached, conversely, operation at crawling speed is effected via damping nozzles, which allow adjusting the crawling speed. The now-damped operation of the opening piston makes it possible to approach the desired terminal position by sensitive control. The ratio between the high-speed range and the crawling speed (fine-control range) can be adjusted from outside by adjusting the adjusting spindle for the metering valve. The fast reaction of the opening piston remains possible despite the severe hydraulic damping. To enable fast reaction even outside the functional range of the metering valve, a prestressing valve is provided, which if a certain control pressure is exceeded opens the connection between the control pressure conduit and the opening chamber and opening piston (claim 17).

The embodiment of claim 18 serves the purpose of damping pressure fluctuations of the control pressure both in the fast mode and in the fine-control mode.

Further advantages and exemplary embodiments of the load-holding brake valve of the invention will now be described in detail in conjunction with the drawings.

Figure 2:
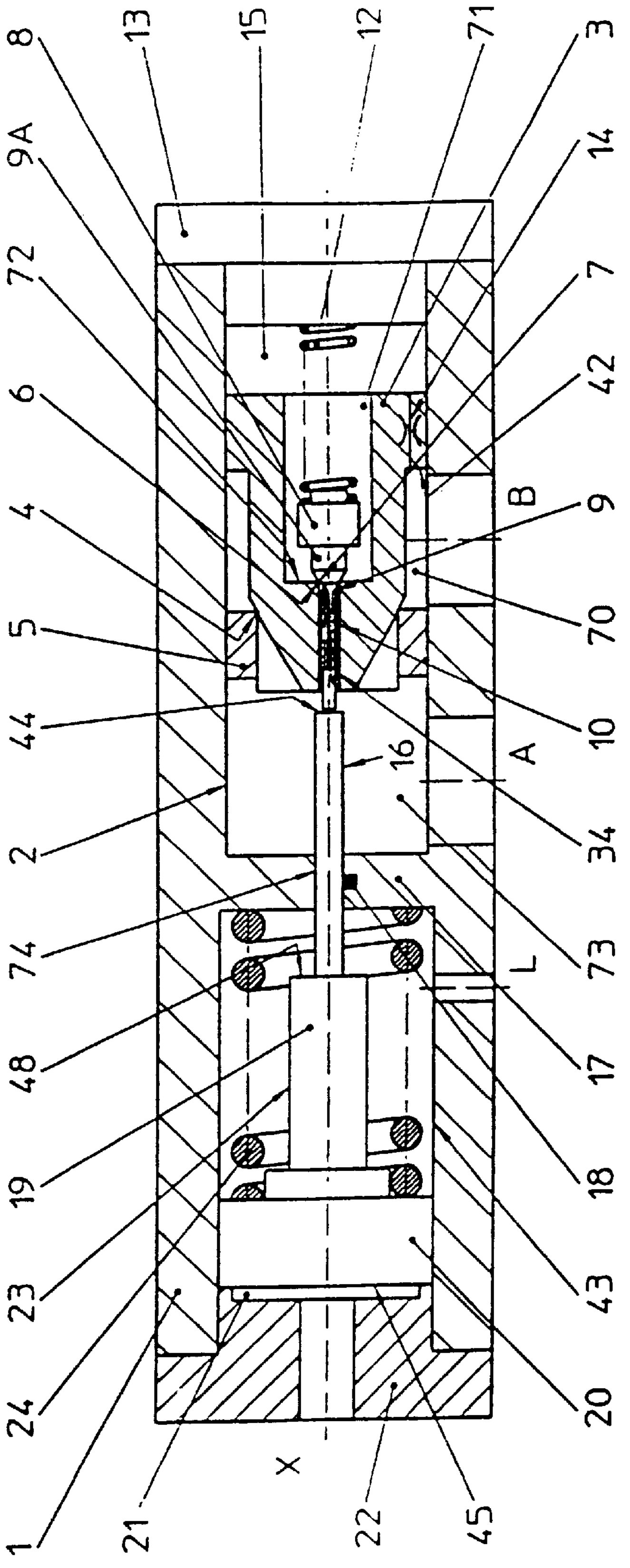
Figure 3A:
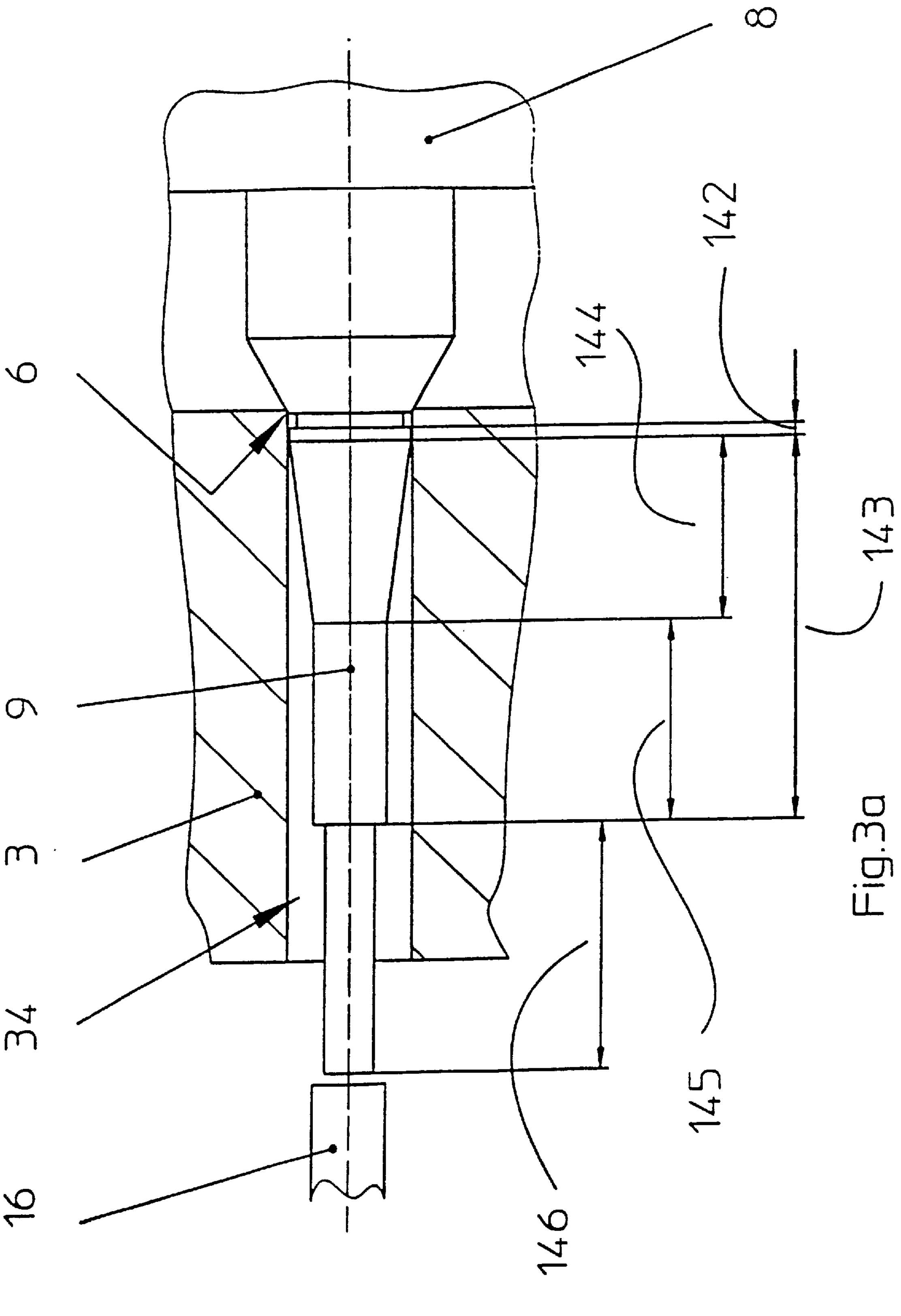
Figure 4:
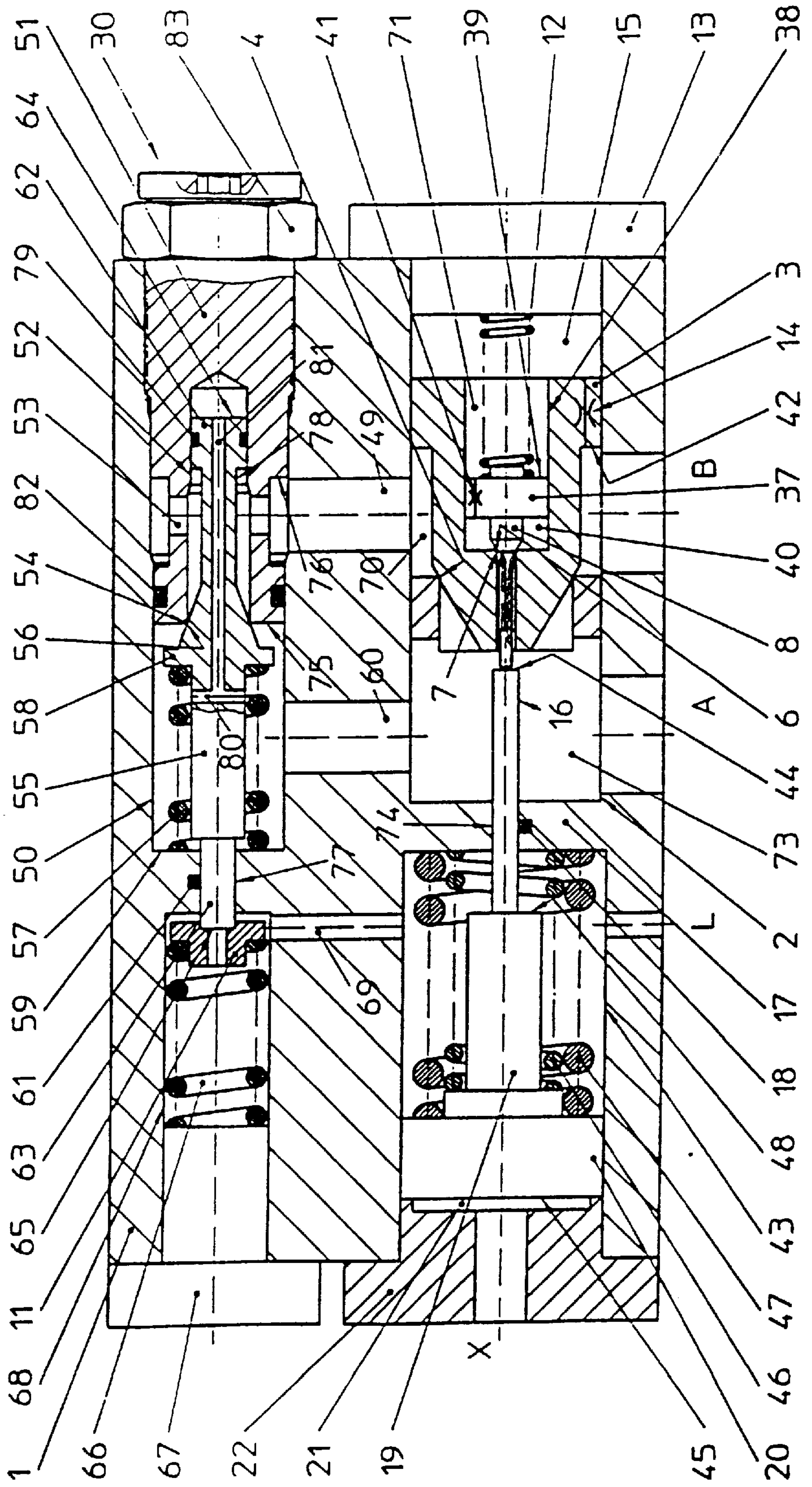
Figure 5:
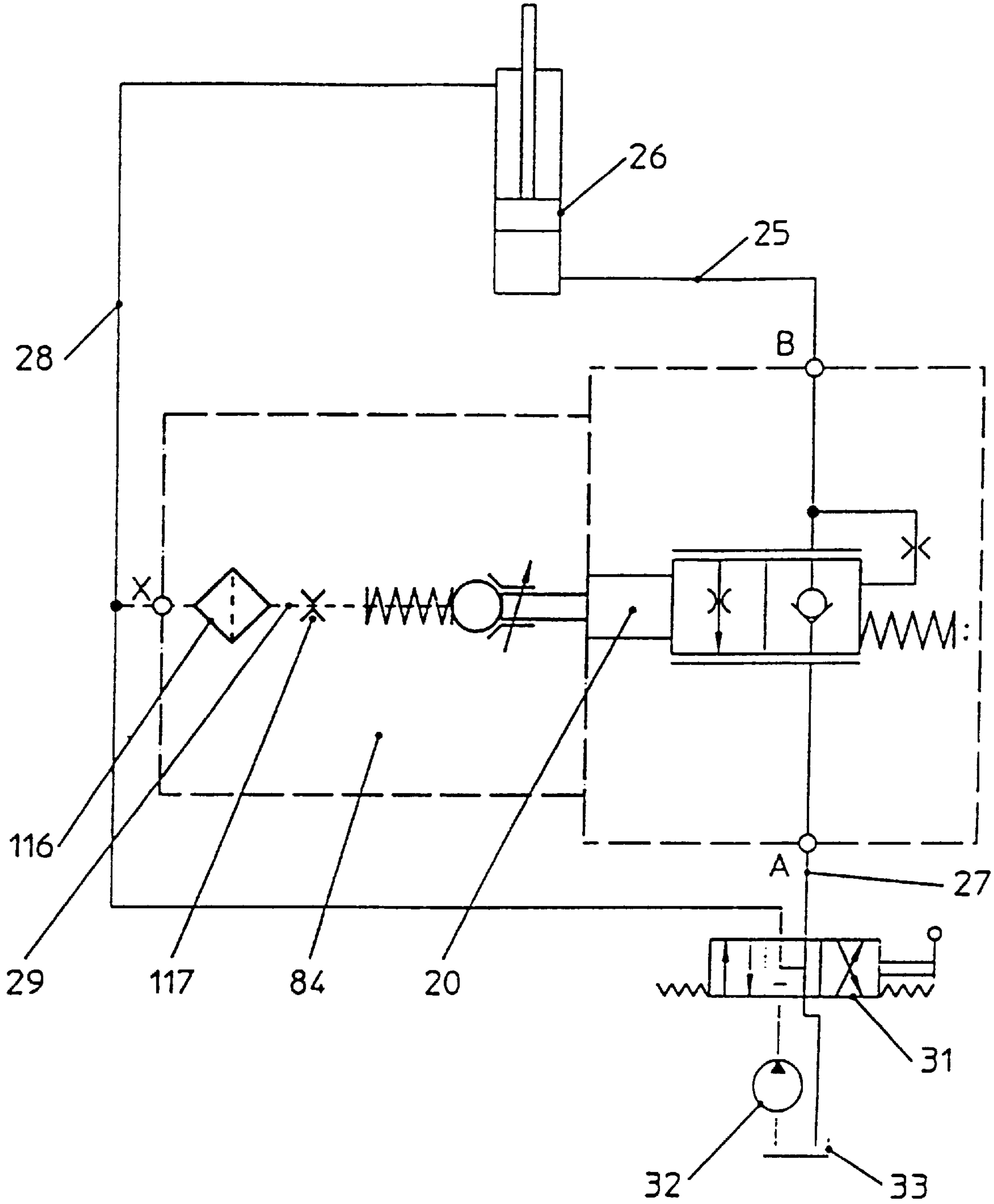
Figure 6:
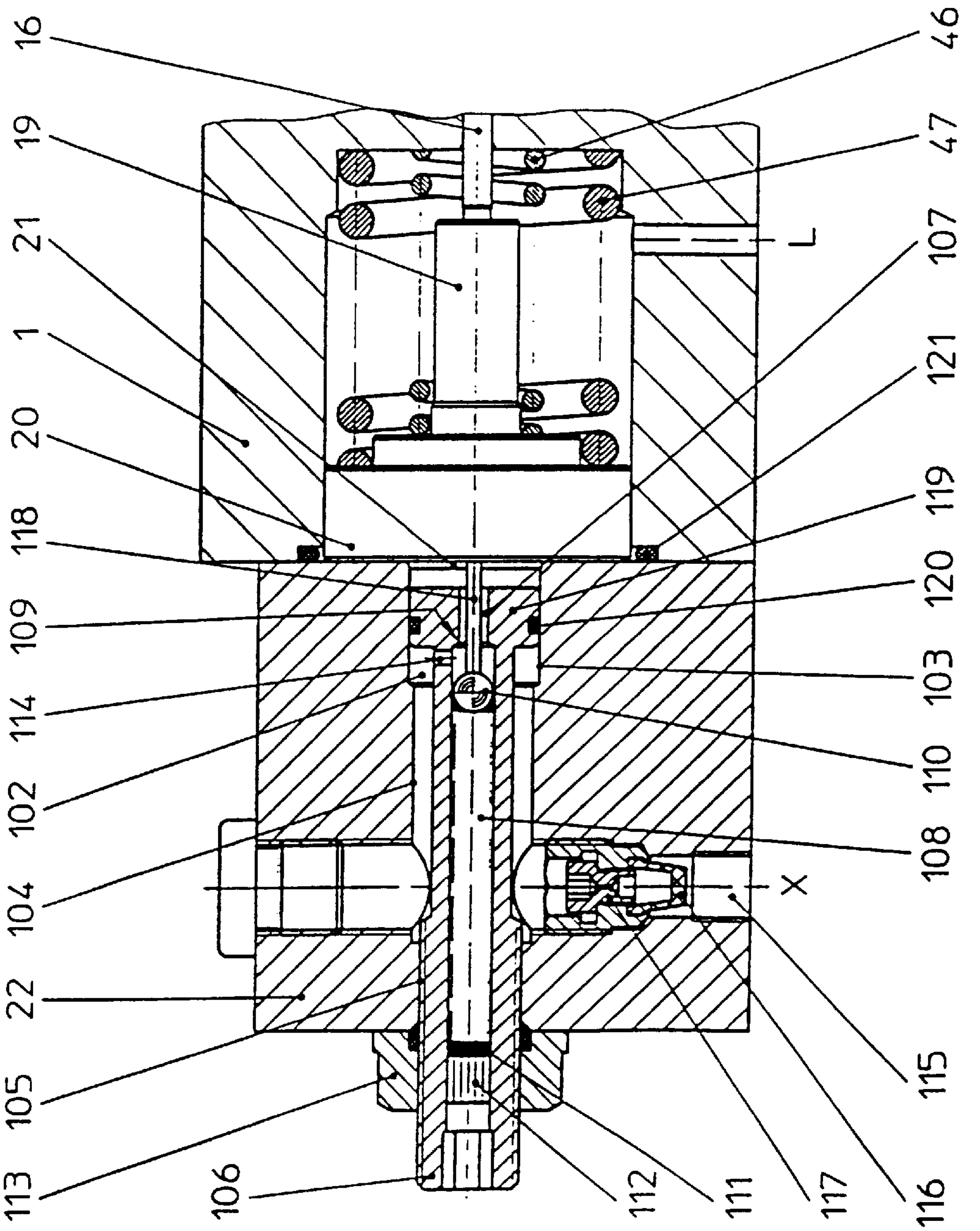
Figure 7:
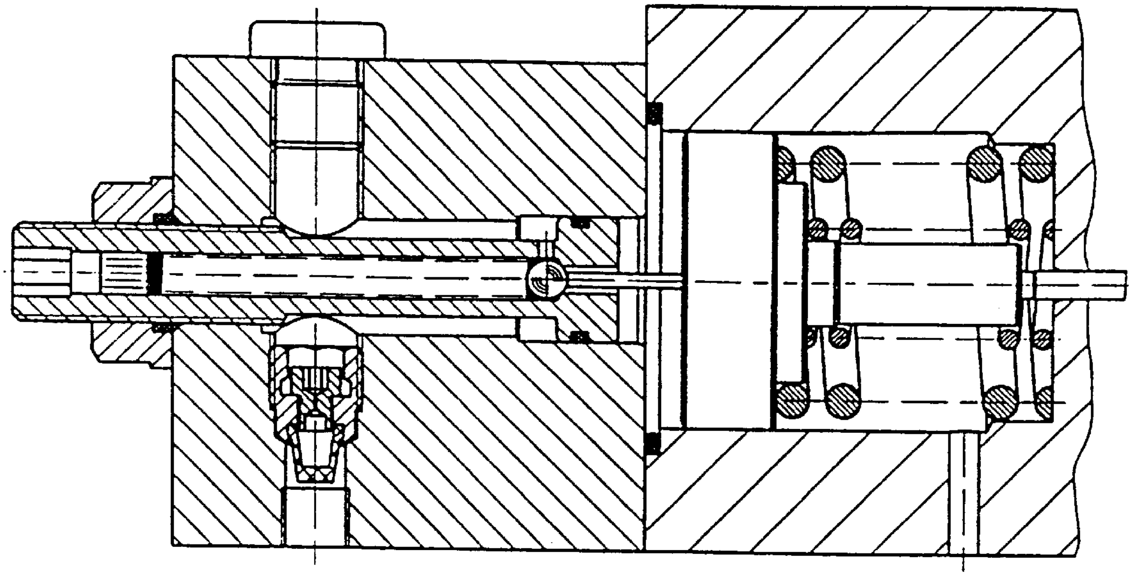
Figure 8:
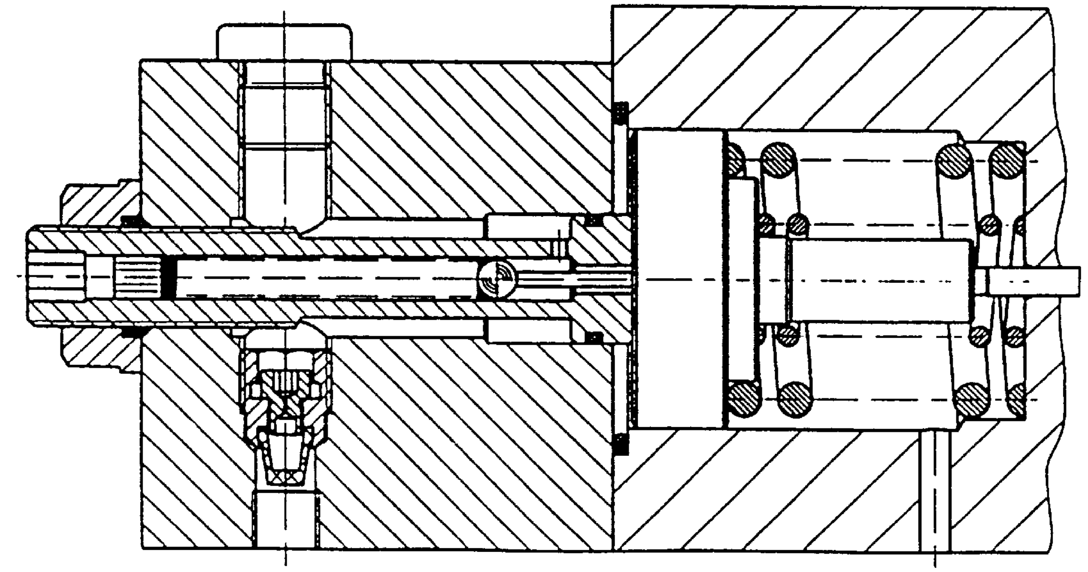
Figure 9:
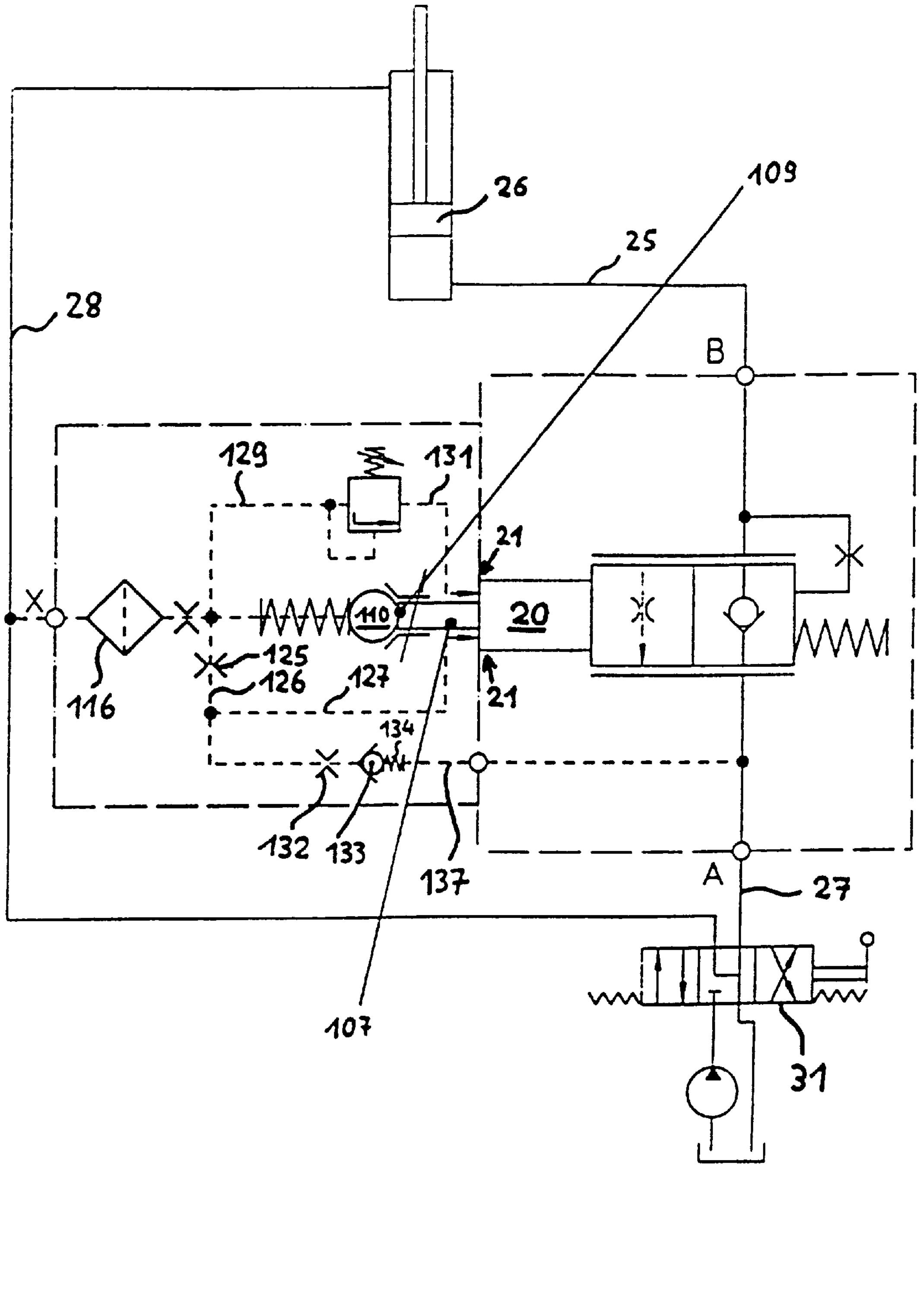

Shown are:

FIG. 1, a hydraulic circuit diagram for controlling a consumer in the sense of adapting an outflow current to an inflow current;

FIG. 2, a longitudinal section through a variant of a load-holding brake valve;

FIGS. 3*a*/*b*, a longitudinal section through a pilot valve;

FIG. 4, a longitudinal section through a variant of a load-holding brake valve;

FIG. 5, a hydraulic diagram corresponding to FIG. 1 with hydromechanical limitation of the opening current;

FIG. 6, detail of the metering valve of FIG. 5;

FIG. 7, the detail of FIG. 6 but in the state of the projected stroke of the opening piston, in other words during hydraulic stroke limitation;

FIG. 8, the detail of FIG. 5 but with mechanical opening of the opening piston;

FIG. 9, a hydraulic circuit diagram corresponding to FIG. 1 with hydraulic damping of the outflow current, with an overpressure valve, damping bypass and relief bypass.

Figure 10:
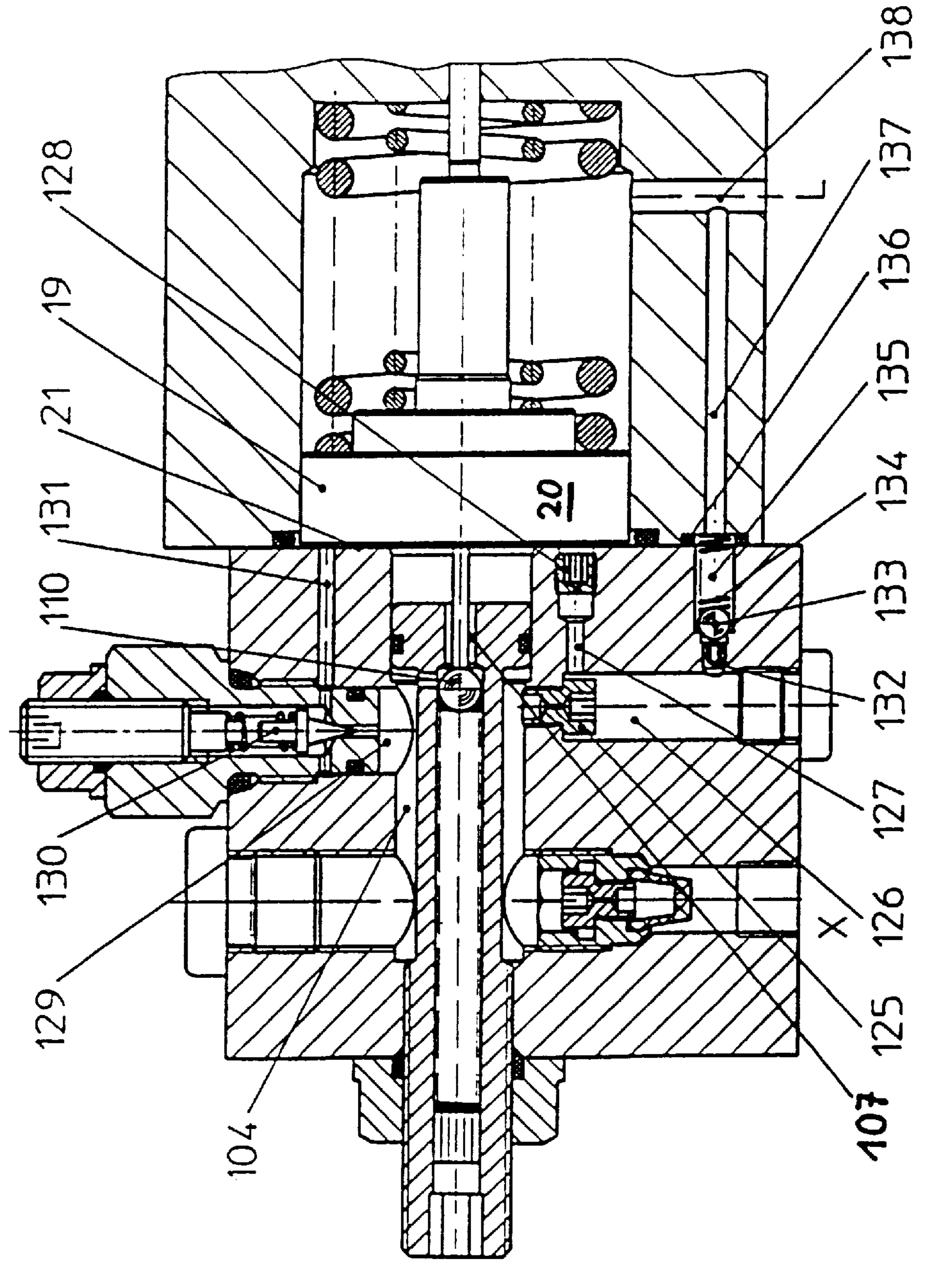

FIG. 10, an exemplary embodiment for FIG. 9.

FIG. 1 shows the hydraulic circuit diagram for controlling a consumer in the sense of adapting an outflow current to an inflow current by means of a load-holding brake valve. The consumer 26 is connected to the inflow line 28 and the lowering line 25. The lowering line 25 is connected to connection B of the load-holding brake valve 1A. From the load-holding brake valve 1A, a return line 27 leads from connection A to the multiway valve 31. The inflow line 28 likewise ends at the multiway valve 31. The multiway valve 31 is embodied here as a 4/3-way valve. Along with the inflow line 28 and the return line 27, the connection of a pump 32 and the connection of a line to the tank 33 are provided. The load-holding brake valve 1A communicates with the inflow line 28 via a control line 29. The pressure limiting valve 30 is also connected between the lowering line 25 and the return line 27. In the switching position shown, the inflow line 28 and the return line 27 communicate with the tank 33. The consumer 26 thus remains in the position it is in at this moment. The communication between connection B and connection A of the load-holding brake valve 1A is blocked.

If the slide-type multiway valve 31 is displaced to the right, the inflow line 28 is made to communicate with the pump 32. The consumer 26 is now in the lowering mode. The return line 27 therefore communicates with the tank 33. The communication between connection B and connection A in the load-holding brake valve 1A, however, remains closed until the pressure buildup in the inflow has been accomplished and an adequate control pressure is applied via the control line 29 to the load-holding brake valve 1A. Then the load-holding brake valve 1A is displaced to the right counter to the spring. Connection B and connection A in the load-holding brake valve 1A now communicate with one another via a variable throttle. The volumetric flow thus flows out of the lowering line 25 to the return line 27 and into the tank 33. The load-holding brake valve 1A remains in this position as long as the control pressure is applied constantly. Thus any change in the inflow pressure has a direct effect on the opening cross section of the load-holding brake valve.

If the slide-type multiway valve 31 is displaced to the left, then the pump 32 communicates with the return line 27.

The inflow line 28 communicates with the tank 33, so that no pressure is present on the control side of the load-holding brake valve 1A, and the load-holding brake valve 1A remains in the position shown. This is the position in which the consumer 26 is located in the raising mode. The volumetric flow passes via the return line 27 and the check valve in the load-holding brake valve 1A to reach the connection B. From there, the oil flows through the lowering line 25 to the consumer 26.

The pressure limiting valve 30 is used to secure the load pressure in the lowering mode or to stop the consumer and is disposed between the lowering line 25 and the return line 27. An additional pressure securing means is typically disposed at the multiway valve (not shown here).

FIG. 2 shows a longitudinal section through a load-holding brake valve without an integrated pressure limiting valve. The load-holding brake valve has a housing 1 with a cylindrical control chamber 2. The control chamber comprises chamber segments, preferably arranged in alignment, specifically in this order: pilot chamber 15; annular chamber 70, which communicates (via connection B) with the lowering line 25 of the consumer 26; return chamber 73, which communicates (via connection A) with the return line 27 to the tank; opening chamber 21, which communicates with a control conduit X;

The cylindrical control chamber 2 is closed on the end by control chamber plug 13. The connection bores A and B discharge into the control chamber 2 perpendicular to the longitudinal axis of the control chamber 2. Between the connection bores A and B, the control chamber 2 has a valve seat 5. Between the connecting bores A and B, the control chamber 2 has a valve seat 5. The valve seat 5 is mounted in stationary fashion on the valve housing 1 and divides the annular chamber 70 from the return chamber 73. Between one end of the control chamber 2 having the control chamber plug 13 and the valve seat 5, a main piston 3 is movably guided. The main piston 3 has a thinner collar with a conical sealing face 4, which cooperates with the valve seat 5. On the side remote from the valve seat 5 and the connecting bore B, the main piston 3 has an end collar 42. The end collar 42 has a larger diameter than the aforementioned collar and is sealingly guided in the control chamber 2, so that the main piston 3 is axially movable. Because it is embodied as a stepped piston, the main piston 3 forms the annular chamber 70, which communicates with the lowering line 25 via connection B. The annular chamber 70 is made to communicate with the return chamber, connection B and the tank 33, by the lifting of the main piston 3 from the valve seat 5. The region of the control chamber 2 between the thick end collar 42 of the main piston 3 and the control chamber plug 13 is designated the pilot chamber 15. This pilot chamber 15 serves to receive a spring 12A (not shown), which is fastened between the control chamber plug 13 and the main piston 3. What is shown is a spring 12—to be described in further detail hereinafter—which to this extent has the same function, so that the main piston 3 is pressed against the valve seat 5 by spring force, but in addition also by the hydraulic forces acting upon it.

The annular chamber 70 communicates with the pilot chamber 15 via the throttle 14. The throttle 14 may-as shown-be disposed axially parallel in the thicker piston collar, but can also be disposed in the valve housing. The main piston 3 is concentrically penetrated by a pilot conduit 34, which connects the pilot chamber 15 with the return chamber 73. To this end, the main piston 3 has a stepped bore 71 arranged concentrically relative to the pilot chamber 15. From the bottom 72 of the first step of larger diameter, the step, designated as the pilot conduit 34, of smaller diameter begins. The pilot valve seat 6 is formed on the bottom 72 between the step 71 and the pilot conduit 34.

A pilot piston 8 is guided movably with play in the pilot conduit 34 by its piston shank, which is the pilot tappet 9. The pilot piston 8 and the pilot tappet 9 are made in one piece, or in two pieces. The pilot tappet 9 has a smaller diameter than the pilot piston 8 protruding out of the pilot conduit 34. The pilot piston 8, on its end connected to the pilot tappet 9, has a sealing face 7, which rests on the pilot valve seat 6 under the force of the pilot spring 12 (closing spring). The smaller area of the truncated cone is substantially equivalent to the cross section of the pilot conduit 34 and the adjoining region of the pilot tappet 9.

The pilot tappet 9 has a plurality of diametrical or cross-sectional regions over its length.

The conical seat is adjoined by a small groove in the form of an undercut. The groove extends circumferentially and is present essentially for technical production reasons.

This groove is joined by a very short region of large cross section (that is, cross-sectional area) of the pilot piston 8. This region is cylindrical and with slight play has a diameter equivalent to the diameter of the pilot conduit 34 and the smaller sealing face 7. Its length can verge on zero, so that it merely represents the beginning of the ensuing region.

The very short region of large cross section is adjoined by a region of decreasing throttling action. The throttling action that decreases with the tappet motion is attained in that the cross section of this region—beginning at the maximal cross section—decreases steadily over at least a partial length, and/or that the portion of this partial length that has dipped into the pilot conduit becomes shorter upon displacement of the pilot tappet. A further partial length of this region may have a constant cross section, which however is larger than the cross section of the then ensuing region of least cross section. The decreasing throttling action is due to the fact that with the tappet motion, the region of decreasing cross section emerges from the pilot conduit into the pilot chamber first. As the tappet motion continues, the partial length of the pilot tappet that dips into the pilot conduit 34 varies; this partial length has a constant cross section. The variation in throttling action in this region of the pilot tappet 9 accordingly is effected by variation of the throttling cross section and/or length that dips into the pilot conduit 34 and is guided therein. This means that the region of decreasing cross section or decreasing throttling action must not be any longer than the pilot conduit 34. The length depends in particular on the desired opening performance in relation to the control pressure.

However, the region may be embodied cylindrically with the same diameter as the region preceding it, and chamfers or grooves may be made on the cylinder jacket that begin at the largest cross section and end at the smaller, constant cross section. Embodiments of the region with decreasing cross section that are favorable from both a fluidic and a production standpoint are described in conjunction with FIGS. 3*a* and 3*b*.

The end of the pilot tappet 9 (piston shank) has a minimal cross section that is substantially equivalent to the minimal cross section of the region of decreasing cross section. This end region is now located only partly inside the pilot conduit 34. It extends past the length of the pilot conduit 34 and protrudes with its end into the return chamber 73 of the control chamber 2.

The following is shown in particular: Adjoining the sealing face 7, the pilot tappet 9 has an encompassing undercut groove 35. This is adjoined by a cylindrical region, whose diameter corresponds, with play, to the diameter of the pilot conduit (region of largest cross section, region of maximal cross section).

Spaced only slightly apart from the undercut, the "region 143 of decreasing throttling action" begins. The entire region 143 may have a decreasing cross section and may be embodied as a turned body with a rectilinear jacket line, or preferably a parabolic or hyperbolic jacket line.

The transition between the region of maximal cross section and the region of decreasing q deserves particular attention. This transition must be smooth, so that when the pilot tappet 9 moves within this region, the load motion will not suffer any jarring or bumps.

In FIG. 3*a*, the decreasing throttling action of the region 143 over the first partial length 144 is attained by means of a decreasing cross section of the tappet. Over this partial length, the tappet is embodied slightly conically, or in other words as a truncated cone. The large cone face corresponds to the cross section of the preceding region of maximal cross section. The small cone face corresponds to the cross section of the partial length 145 that then follows and that has a constant cross section. This partial length 144 causes only a slight throttling action in the pilot conduit, and this action decreases steadily as this partial length emerges from the pilot conduit. This partial length is therefore of only secondary importance to the function of the valve. Its length can therefore verge on zero. What is important is the design and length of the preceding region of decreasing cross section. With respect to the drawing, it must be emphasized especially that the transition between the region of maximal cross section and the region of decreasing cross section cannot be shown to true scale. In actuality, an encompassing edge must not be formed there, because a smooth or in other words parabolic or hyperbolic transition is desired. Nor is it possible to show the parabolic or hyperbolic design of the jacket line. What is shown is a linear jacket line, but this cannot be considered preferred in the sense of this invention.

The partial length 145 of constant cross section is adjoined by a region 146 of minimal cross section. It will be stressed that this minimal cross section is in any case smaller than the cross section of the preceding partial length 145 of constant cross section. The border between the two cross-sectional regions, however, is located in the pilot conduit when the pilot valve is closed. The region of minimal cross section protrudes out of the pilot conduit into the return chamber.

Figure 3B:
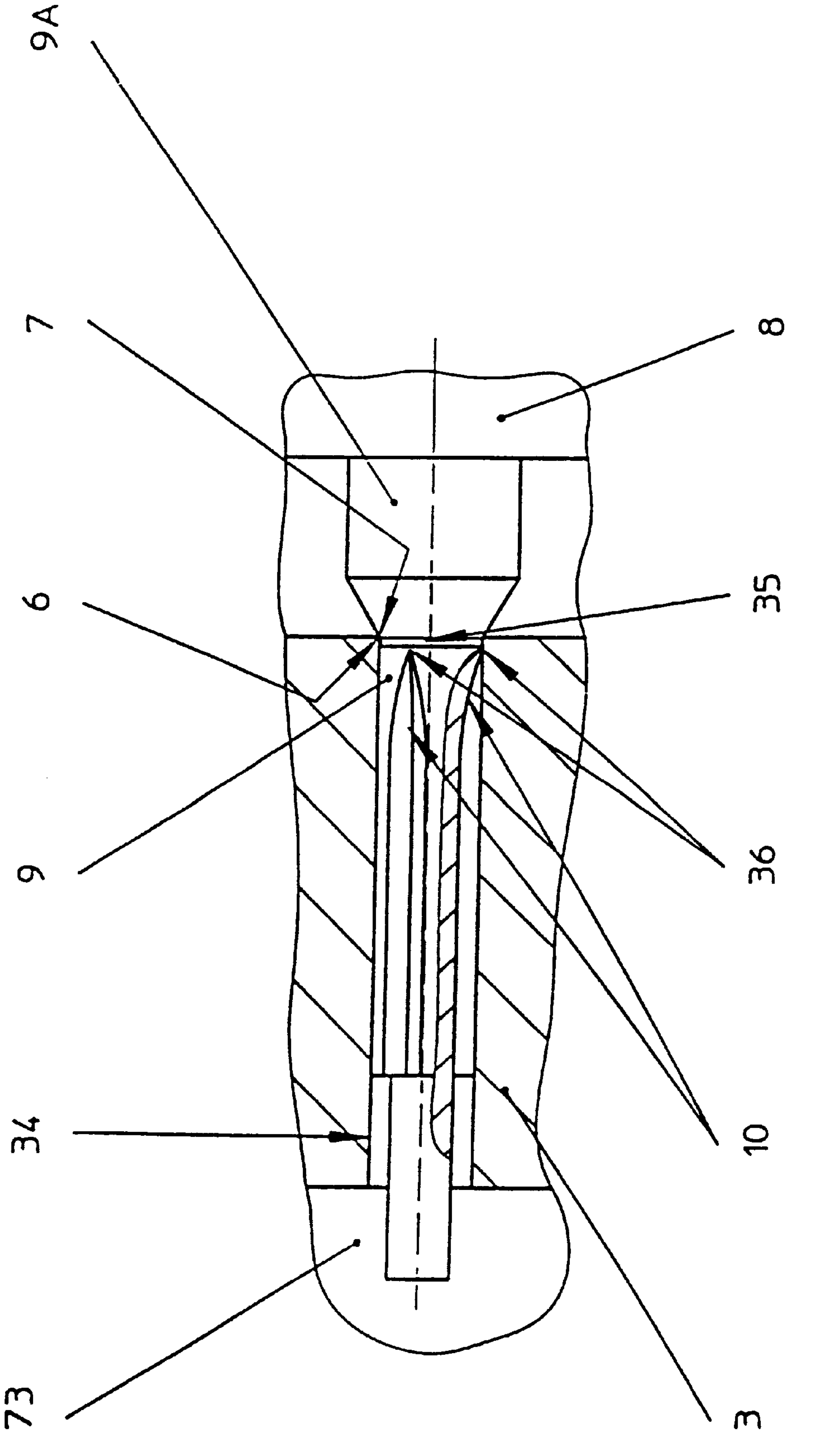

The version of the pilot tappet 9 shown in FIG. 3*b*, in the region of decreasing throttling action, has a plurality of throttle grooves 10 in the axial direction, which with the wall of the pilot conduit 34 form the throttle restriction 36. In the region of decreasing cross section, the throttle grooves 10 have a depth that increases steadily—and preferably progressively—toward the free end of the pilot tappet 9 (partial length of decreasing cross section). They then retain the attained maximal depth at (partial length of constant cross section). Following the region with the throttle grooves 10 (region of decreasing throttling action) is once again the region of minimal cross section. This region is again embodied cylindrically. The diameter may correspond essentially to the diameter of the deepest groove bottom of the throttle grooves 10.

The throttle grooves 10 may be replaced with flattened faces or notches made axially or helically on the pilot tappet 9. Instead of or in addition to the depth, the width of the throttle grooves 10 may be varied. This is true particularly for the initial region of the grooves, that is, the region of decreasing throttling action. The grooves begin at the region of maximal cross section with a depth of zero and a width of zero. By means of an increase in the width and depth of the grooves, a smooth parabolic or hyperbolic or other course of the cross section of the tappet can be attained.

Mode of Operation

Upon axial displacement of the pilot piston 8 toward the right, the pilot tappet 9 opens, in that the sealing face 7 lifts up from the pilot valve seat 6. As long as the region of maximal cross section dips into the pilot conduit 34 (throttle restriction 36), the volumetric flow remains severely throttled, and this throttling action in comparison with the pilot throttle 14 determines the pressure reduction in the pilot chamber and thus the opening performance of the main piston.

With increasing axial displacement of the pilot tappet 9, the region of maximum tappet cross section emerges from the pilot conduit 34 and therefore steadily decreases its throttle action. The throttling action is now determined by the region of decreasing throttling, or in other words first by the decreasing cross section of the pilot tappet 9 emerging from the pilot conduit 34. Here the depth of the throttle grooves decreases (FIG. 3*b*), or the diameter of the tappet decreases (FIG. 3*a*). The throttling action becomes steadily less upon emergence of this partial length (truncated cone or grooves) from the pilot conduit 34 into the pilot chamber. Once the least cone cross-sectional area of the truncated cone, or the greatest depth of the throttle grooves, have reached the pilot valve seat 6, the decrease in the throttling action, while it does continue, does so to a substantially lesser extent, since the length of the portion of constant cross section that has dipped into the pilot conduit decreases. The fact that at this time the region of minimal cross section continues to be dipped into the pilot conduit 34 has no effect, since the throttling action of this region is only very slight.

What takes place is thus a continuous, slow pressure reduction. The opening cross section of the pilot valve seat 6 is also greater, immediately after the opening, than the throttling cross section in the pilot conduit (throttle restriction 36).

A dividing rib 17 (FIG. 4), divides the return chamber 73 from the control bore 43 that is axially aligned with it. The control bore 43 is closed on the other face end by the plug 22. An opening piston 20 (guide collar) is sealingly guided in the control bore 43. The opening piston 20 subdivides the control bore 43 into the opening chamber 21 and the spring chamber adjacent to the dividing rib 17. The plug 22 has a connecting bore X, by which the opening chamber 21 communicates with the control line 29 (FIG. 1).

The opening piston 20 has an opening shank 16, 19, which comprises a thicker portion 19 and a thinner portion 16. The thinner portion 16 of the opening shank pierces the dividing rib 17 and is guided sealingly (seal 18 or a sealing gap) in the dividing rib in the guide bore 74. The free end of the opening shank 19 with the end face 44 protrudes into the return chamber 73, and the opening shank 16, 19 and the pilot tappet 9 of the pilot piston 8 are located on the same axial line. The opening piston 20 is pressed into its outset position, by an opening spring 24 embodied as a compression spring that is disposed in the spring chamber 43 and braced on the dividing rib, if no control pressure is applied to the opening chamber 21. The spring chamber 43 is pressure-relieved by means of the oil leakage line L. For safety reasons, the opening spring 24 is formed by one or more parallel-connected springs 46, 47 (see FIG. 4).

The thicker region 19 of the opening shank 19 forms an end face 48 toward the thinner region 16. This end face acts as a stop face 48 for mechanically limiting the stroke of the opening piston 20, by coming to rest on the dividing rib 17. In terms of dimensioning, it can be noted that the guide collar of the opening piston 20 has an end face 45, acted upon by a control pressure, whose active area is in a ratio of greater than 50:1 and preferably greater than 100:1 to the active area of the pilot valve seat 6.

Furthermore, the ratio of the end face 45 on the guide collar to the end face 44 on the opening end 16 is greater than 30:1 and in particular greater than 60:1.

With the advantageous design described above, the control pressure remains largely independent of the load pressure.

In particular, the control pressure also remains largely independent of the return pressure. The pressure relief of the spring chamber 43 in the region of the opening spring 24 thus makes it possible for a precisely predetermined course, dependent on the buildup of the control pressure, of the force acts on the opening piston 20. For safety reasons, it is advantageous here if a plurality of springs act on the opening piston 20. This assures that even if one spring breaks, the opening piston 20 will still be controllably displaced into its closing position, for instance if a line should break.

The course of the throttling cross section at the pilot tappet is embodied such that a displacement motion of the pilot piston 8 in the opening direction, imposed by the opening piston 20, is possible only with an increasing hydraulic force at the opening piston 20 for the hoisting mode.

The ratio of the active areas of the main piston 3 and the pilot piston 8 is designed such that no relative motion, in the sense of opening the pilot valve seat 6, between the main piston 3 and the pilot piston 8 can be induced.

Mode of Operation of the Load-holding Brake Valve When Stopped

In the connecting bore B and the annular chamber 70, the load pressure of the consumer is present. The pilot chamber 15 communicates with the annular chamber 70 via the throttle 14. The load pressure acts on the active area of the thicker end collar 42 of the main piston 3. The main piston 3 with its sealing face 4 is pressed both by the spring 12 and hydraulically against the valve seat 5.

The pilot piston 8 is acted upon by the load pressure and the force of the spring 12; it is held with its sealing face 7 on the pilot valve seat 6. The connection of B to A is thus blocked without leakage.

In the Lowering Mode

The multiway valve 31 (FIG. 1) connects the consumer 26 to the pump via the inlet 28 and to the tank via the return line 27. The load-holding brake valve communicates with the pump both via the control line 29 and the connecting bore X via the inlet 28. The pressure, which is variable by the multiway valve, acts as a control pressure on the opening piston 20. In accordance with the control pressure, the opening piston 20 is displaced toward the dividing rib 17 counter to the opening spring 24, until the spring force and the opening force are in equilibrium. The opening shank 16, with its end face 44, meets the free end of the pilot tappet 9 of the pilot piston 8 in this process and displaces the pilot tappet 9—in absolute terms—by a distance that is proportional to the opening pressure. The sealing face 7 of the pilot piston 8 is lifted out of the pilot valve seat 6. This creates the communication between the return chamber 73 and the pilot chamber 15, whose throttling action depends on the design of the pilot tappet 9 and on the length of the tappet travel or opening travel or the magnitude of the control pressure. At low opening pressure, or in other words as long as the region of the pilot tappet 9 having the maximal cross section is located inside the pilot conduit 34, this communication is very severely throttled. Upon continued opening, however, the throttling action becomes less than the throttling action of the compensation throttle 14 in the main piston. This causes a slow pressure drop in the pilot chamber 15, and thus commences a slow motion of the main piston, in the direction of opening both the main valve seat 4 and the communication between the annular chamber 70 and the return chamber 73. The load is therefore lowered very slowly. The motion of the main piston 3 in the direction of opening the main valve seat, relative to the pilot piston and the pilot tappet 9, means a motion in the direction of closing the pilot valve 6/7, because the absolute position of the pilot tappet 9 is predetermined by the position of the opening piston 20. Since the main piston 3 follows the motion of the pilot piston 8, the throttling cross section at the throttle restriction 36 in the pilot conduit 34 will accordingly narrow again. As a result, a higher pressure builds up again in the pilot chamber 15. This pressure buildup assures that a state of equilibrium will be established between the pilot piston 8 and the main piston 3.

As soon as the control pressure is further increased, the region of the pilot tappet 9 of decreasing cross section emerges again from the pilot conduit 34 and the pilot valve seat 6. Thus the pilot conduit is opened further, or in other words the throttling action of the pilot tappet 9 decreases further. An increasing volumetric flow flows out of the pilot chamber 15 past the pilot tappet 9, for instance through the throttle grooves 10 disposed in the pilot tappet 9, and on into the return chamber 73. The throttling cross section in the pilot conduit 34 is dimensioned here, for instance by the throttle grooves 10, such that with the motion of the pilot tappet 9 a uniform, slow reduction in the throttling action ensues, and consequently a steady pressure decrease in the pilot chamber 15. As a result, a progressive opening performance of the pilot piston 8 is attained, which is unequivocally defined by the magnitude of the control pressure.

The length and throttling action of the throttling region of the pilot tappet 9 are adapted to the spring forces and hydraulic forces on the main piston 3. Any motion of the opening piston 20 and the pilot piston 8 and pilot tappet 9 is followed immediately and uniformly by the main piston 3.

The design of the main piston 3 in conjunction with the valve seat 5 also has the advantage that the flow forces acting in the closing direction are always counteracted by a hydraulic opening force, which is greater in every position than the flow forces. This prevents possible pressure fluctuations in connection B from affecting the main piston 3.

Since the opening piston 20 has a large active area in comparison to the pilot valve seat 6, the opening pressure is substantially independent of the load pressure. The ratio between the active area of the opening piston 20 and the active area of the pilot valve seat is greater than 50:1 and preferably greater than 100:1. Furthermore, the opening piston 20 has a ratio of its end faces 45 and 44 that is preferably greater that 30:1. This makes the opening pressure also largely independent on the return pressure.

If the control pressure in the opening chamber 21 that acts on the end face 45 lets up, or collapses—for instance because of a line break, then the opening piston 20 is pushed backward by the spring 24 and finally comes to a stop at its opening position. Because of the spring 12, it is followed by the pilot piston 8, which closes the pilot valve seat 6/7. As a result, the pilot pressure in the pilot chamber 15 is built up again, with the result that the main piston follows and closes the valve seat 4/5. The communication from the connecting bore B to the connecting bore A is closed, so that the load of the consumer comes to a stop.

In the Hoisting Mode

Here, the connection A communicates with the pump 32, as can be seen from FIG. 1. The pump pressure in the return chamber 73 is exerted on the valve seat 5 and lifts the main piston 3, counter to the spring force (spring 12 and optionally spring 12A), and opens the valve seat 5. The load is hoisted. Because of the major difference between the active area of the valve seat 5 and the active area of the pilot valve seat 6, in this check valve function the main piston 3 will be moved together with the pilot piston 8. Because of the large area of the valve seat 4 on the main piston 3, only very slight throttling losses ensue at the valve seat.

It will be noted that in the load-holding brake valve of the invention, both the compensation throttle 14 and the prethrottle bore 41 can also be replaced with nozzles, so that a pressure reduction that is independent of viscosity can occur.

A pressure limiting valve for securing the load can be integrated with the load-holding brake valve. This is shown in FIG. 4 and will now be described.

The exemplary embodiment of FIG. 4 is identical, in terms of the control chamber 2 and the control bore 43 and in terms of the valve function, to the load-holding valve of FIG. 2. Reference is therefore made to the description thereof, and only the differences will be noted.

In this exemplary embodiment, the pilot piston 8 and the main piston 3 are advantageously braced only with the spring 12, which is braced on the valve housing. The main piston 3 is axially moved substantially by hydraulic forces. The pilot piston 8 in this version has a guide shank 37, which is sealingly guided in the stepped bore 71 of the main piston 3. Thus an antechamber 40 to the pilot chamber 15 is formed between the pilot valve seat 6 and the guide shank 37, concentrically with the opening piston 8. The antechamber 40 communicates with the pilot chamber 15 via a prethrottle 41. The throttling cross section of the prethrottle 41 may be designed to be greater than, equal to, or less than the throttling cross section of the compensation throttle 14. This design of the pilot piston 8 has the advantage that the pressure reduction in the pilot chamber 15 is effected via two steps that have a fixed throttling cross section. Particularly in the opened state, the prethrottle bore 41 has the effect that with increasing load pressure, a greater closing force acts on the pilot piston 8. The greater closing force means that because of the axial displacement, the throttling cross section in the pilot conduit (throttle restriction 36 in FIG. 3) decreases as well, and thus because of the followup control increasingly closes the main piston 3. This system is especially advantageous in the case of an open loop. Here a control pressure on the opening piston 19 is specified, which is independent of the pump pressure and independent of the inflow pressure and for instance may also be fixedly set.

Because of the large area of the opening piston 20, two parallel-connected prestressed springs 46 and 47 can be fastened as an opening spring in the control bore (spring chamber) 43, between the guide collar 20 and the dividing rib 17. If a spring breaks, the other spring is capable of moving the opening piston to its outset position. This is of particular significance with a view to safety.

In the load-holding brake valve shown in FIG. 4, a pressure limiting valve 30 is integrated with the valve housing 1. The pressure limiting valve 30 is embodied as a check valve, which allows a flow from the load side (annular chamber 70) toward the tank side (return chamber 73). The pressure limiting piston 55 has only a very small surface area acting in the opening direction. This is attained in that the pressure limiting piston 55 has a shank which penetrates the load chamber 53 and makes it into an annular chamber;

the load chamber 53 is defined on one side by the piston 55 with the check valve seat 54 and on the other side by an end collar 62 secured to the shank; and the check valve seat 54 has only a slightly larger hydraulic active area than the end collar 62 secured to the shank.

For construction, a blind bore 50 is made in the valve housing 1, on the face end toward the control chamber. The blind bore 50 communicates with the annular chamber (load chamber) 70 by means of an overload bore 49 and with the return chamber 73 via the return bore 60. The plug 51 (bush) is screwed into the blind bore 50. An inner bore 52 is made centrally in the plug 51; this bore is open toward the blind bore and with its end forms the check valve seat 54. The check valve seat 54 is located between the overload bore 49 and the return bore 60. The inner bore 52 communicates with the overload chamber 49 via the radial bores 53 and a turned groove 76 on the plug 51. The overload chamber 49 and the return chamber 60 are disposed between the bore 68 and the inner bore 52 of the valve housing of the pressure limiting valve 30. The spring-loaded pressure limiting piston 55 of the pressure limiting valve 30 has a sealing face 56 which rests on the check valve seat 54 under the prestressing force of a compression spring 57, 66 and seals off the radial bore 53 from the return chamber 73. The pressure limiting piston 55 has a respective end collar 62, 63 on each of its ends. The piston shank passes through the radial bore 53 and has an end collar 62 on its end. This end collar 62 is guided sealingly (seal 79) in the inner bore 52, and its end face 64 is somewhat smaller than the cross section of the check valve seat 54 of the piston. The end collar 63 is attached to the pressure limiting piston 55 and is guided—with a narrowed end portion—in the end wall and guide bore 77 with seal 61 and protrudes into the bore 68. The inner bore 52, which adjoins the overload bore 49, and its end collar 62 are subjected to the pressure of the return chamber 73. This is accomplished by a relief conduit 81, which is embodied as a longitudinal bore in the axis of the piston and which connects the return chamber 73, through a radial duct 80, with the end chamber at the end collar 62. The cross section of this end chamber and of the end collar 62 is slightly smaller than the seat area 54 of the check valve seat 54. The active area which is operative upon a load pressure in the opening direction is equivalent to this difference. The bore 68 communicates for pressure relief with the control bore 43 (spring chamber) and the oil leakage bore L, through the relief bore 69. The thinner end collar 63, protruding into the bore 68, is equal in size, in terms of its hydraulically active cross section (end face 65), to the aforementioned active area in the opening direction; that is, it is equal to the difference between the valve seat area 54 and the cross section of the inner bore 52 with the end collar 62.

The piston 55 of the pressure limiting valve 30 is urged in the closing direction by two parallel-connected compression springs; one compression spring 57 is braced against the piston extension 58 in the return chamber, and the other compression spring 66 in the pressure-relief end chamber is braced against the piston shank by its end collar 63. For adjusting the load securing pressure, the plug 51 is screwed to a variably great depth in the blind bore.

Mode of Operation of the Pressure Limiting Valve 30

In the inner bore 52, the load pressure is exerted against the sealing face 56 of the valve seat 56. As soon as the set load securing pressure is attained, without a previous volumetric flow reduction via the main piston 3, the pressure limiting piston 55 is axially displaced counter to the springs 57 and 66. The sealing face 56 lifts away from the check valve seat 54, and the pressure limiting valve 30 opens. The oil can now flow from the overload bore 49 to the return bore 60 via the opened valve seat 54. As a result, the annular chamber 70 and the return chamber 73 are made to communicate, bypassing the valve seat at the main piston 3, if the load pressure exceeds a preset limit value. The limit value (load securing pressure) is specified by the two compression springs 66 and 57 connected in line parallel to one another.

The consequence of the embodiment of the pressure limiting piston 55 and its pressure relief is that the opening pressure acting on the valve seat 54 in the inner bore 52 is independent of the return pressure and is dependent solely on the load pressure. This exemplary embodiment of a pressure limiting valve is especially suitable for the function of securing loads in the load-holding brake valve. Since in the other circuits there is a downstream pressure limiting valve in the multiway valve, the set pressures are not added together.

FIGS. 5–10 show one option for hydraulic stroke limitation of a pilot-controlled valve. This hydraulic stroke limitation can be applied to all hydraulically pilot-controlled valves in which an opening valve is provided for actuating a valve piston. The hydraulic stroke limitation is realized in a load-holding brake valve as described in FIGS. 1–4. The circuit diagram of FIG. 5 is similar to the circuit diagram of FIG. 1. Full reference is made to the description of FIGS. 1–4. The pressure limiting valve 30 of FIGS. 3 and 4 is not shown here. The load-holding brake valve is supplemented with a metering valve 84 in triggering the opening piston 20 via the control connection X.

For this triggering, a metering valve 84 is used. The metering valve 84 is shown in detail in FIG. 6 and will be described in conjunction with FIG. 6.

The metering valve 84 is located in the cap 22 that defines the opening chamber 21. The cap 22 is flanged in pressure-tight fashion to the valve housing 1 by means of a seal 121. The metering chamber with the valve seat 109 and the metering valve 84 is guided movably and can be positioned relative to the opening chamber 21. To that end, the valve seat 109 of the metering valve 84, for instance, is formed on a closing piston 119, which otherwise closes off the metering valve chamber 102 from the opening chamber 21 and which is sealingly guided and positionable in the metering valve chamber 102 parallel to the opening piston. To that end, there is a longitudinal bore 104, 105 in the cap 22; this bore is coaxial with the axis of the load-holding brake valve. This longitudinal bore is provided with a thread 105 on its end remote from the load-holding brake valve. Over its remaining length (connecting step 104), it has a greater diameter. An adjusting spindle 106 is screwed into the thread 105 and braced in pressure tight fashion by a locking and sealing nut 113. The adjusting spindle 106, with the longitudinal bore 104, 105, forms an annular chamber in the region of the connecting step 104. The control line discharges into this connecting step 104. A filter 116 and a nozzle 117 are incorporated into the control line X. The annular chamber is closed off, on the side toward the load-holding brake valve, by a guide collar 119, which is solidly connected to one end of the adjusting spindle 106 and is sealingly guided in the guide step 103 of the longitudinal bore 102 by means of seals 120 embodied as O-rings. The adjusting spindle 106 is penetrated centrally by a central conduit 108. On the end remote from the load-holding brake valve, the central conduit 108 is closed in pressure-tight fashion by a plug 112. On the end of the central conduit 108 toward the load-holding brake valve, the central conduit 108 opens with a valve opening conduit 107 into the opening chamber 21. The metering valve with the closing element 110 and a shank 118 is located upstream of the valve opening conduit 107. In this case, the closing element 110 is a ball. The shank 118 is braced on one end on the closing element 110 and is preferably solidly connected to the opening piston 20. The shank 118 passes through the valve opening conduit 107 with great play and protrudes into the opening chamber 21 where it rests on the face end of the opening piston 20 that defines the opening chamber 21 on the other side. With the valve opening conduit 107, whose diameter is smaller, the central conduit 108 forms a conical or domelike annular valve seat 109, with which the closing element 110 fits. The closing element 110 is guided with play in the central conduit 108. It is pressed by a spring 111 in the direction of the opening piston 20 in such a way that it is braced on the face end of the opening piston 20, via the shank 118. In the pressureless state of the opening chamber 21, the opening piston 20, under the force of the springs 46, 47, rests on the cap 22 in which the metering valve is located. In this position, the shank 118 supports the closing element 110 far enough away from the valve seat 109 that there is space for a radial conduit 114, which connects the bore 102, and the control conduit X discharging into it, to the central conduit 108 via the connecting step 104.

Mode of Operation

If the control connection x is subjected to control pressure, the control pressure is propagated in the connecting step 104 and the radial conduit 114 on into the central conduit 108. Since the closing element 110 has major play from the walls of the central conduit 108, the control pressure is located on both sides of the closing element 110. The oil stream then passes through the valve opening 107 to reach the opening chamber 21.

The closing element 110 and the shank 118 of the closing element are pressed by the spring 111 in the direction of the opening piston 20, so that the shank 118 and closing element 110 follow along with the opening motion of the opening piston. In this process the closing element 110, here embodied as a ball, reaches the end of the central conduit 108 and comes to rest on the valve seat 109 of the valve opening. As a result, a valve opening 107 is closed, and the opening motion of the opening piston 20 is ended.

This state of hydraulic stroke limitation of the opening valve is shown in FIG. 7, for which moreover the description of FIG. 6 applies. The closing element 110 preferably rests on the seat 109 in a leakage-free manner.

Upon pressure relief of the control connection, conversely, the opening piston 20 subject to the springs 46, 47 moves back toward its stop, that is, the cap 22.

In an emergency, that is, failure of the hydraulic control pressure, it is also possible to actuate the opening piston 20 mechanically. To that end, the adjusting spindle 106 is rotated in its thread 105 in such a way that the front end, toward the opening piston 20, of the adjusting spindle 106—that is, the guide collar 119—strikes the end face of the opening piston 20 and moves the opening piston in the direction of the main piston 3, in the direction of an opening of the pilot valve having the pilot valve seat 6. It thus becomes possible to lower the load without control pressure. This operating state is shown in FIG. 8, for which the description of FIG. 6 also applies.

In FIGS. 9 and 10, a further feature of the metering valve for triggering the opening piston 20 is shown. With regard to the description of the metering valve, reference is made to the description of FIGS. 5–8. In addition, the following three elements are also shown here, which can be used each individually, or in combinations of two or three, together with the metering valve:

a) Metering bypass

From the annular conduit 104, which can be acted upon by the control pressure, a metering bypass conduit 126 branches off via a damping nozzle 125. This metering bypass conduit 26 is continued in a radial duct 127 that discharges into the opening chamber 21. If necessary, a further damping nozzle 128 can be disposed in the radial duct 127.

Mode of Operation

Through the metering bypass conduit 126 with one or more damping nozzles 127, the opening chamber 21 is acted upon by the control pressure even if the closing element 110 closes the valve seat 109. What takes place, however, is now merely an opening of the opening piston 20 that is damped to the desired extent. Thus the function of the metering valve is also changed as a result.

When the metering bypass is employed, the metering valve brings about an unhindered, fast opening of the opening piston 20 in the first control region. The metering valve effects a rapid response of the main valve, that is, the load-holding brake valve, in the lowering mode. This fast control region is ended once the metering valve prevents the inflow of control oil through the valve opening 107 (hydraulic stroke limitation of the fast control region). The opening chamber is now acted upon by control oil only with severe throttling, via the bypass. The accelerated lowering is correspondingly slowed down. In this state, only the metering bypass 127 remains operative, so that the load-holding brake valve can be operated sensitively. Without the use of the metering valve, the demands for a long opening distance with fast triggering and good damping would be possible only if the nozzles needed for the damping were used in the control conduit x and if a very high control pressure were applied for fast triggering of the opening motion. By adjusting the adjusting spindle, the ratio between the fast control region and the total control region can be adjusted.

On the other hand, by the use of the only slightly throttling metering valve, a fast return motion of the opening piston 20 is also made possible, since the two damping nozzles 125, 128 in the metering bypass 126 are bypassed through the valve opening 107.

b) Tank bypass

From the metering bypass, a tank bypass conduit 137 branches off, which connects the metering bypass to the tank conduit 138. A bypass nozzle 132 and a bypass check valve with a ball 133 and a spring 134 are disposed in the tank bypass conduit 137. The check valve prevents the return flow in the metering bypass 126 from the oil leakage termination L to the connecting bore via the nozzle 132.

Mode of Operation

The pressure in the connecting bore 126 opens the ball 133 of the bypass check valve. As a result, some of the control oil flows through the bypass nozzle 132 and the bypass conduit to the tank. This creates a division of the flow and pressure in the metering valve. As a result, pressure fluctuations are damped. The severity of the damping can be determined by the size of the bypass nozzle 132.

c) Prestressing of the control pressure

A prestressing bypass 129, 131 branches off from the annular chamber 104 that is loaded by the control pressure. A prestressing valve (overpressure valve 130), which is adjustable by a screw, is located in this prestressing bypass. The prestressing valve—in a known manner—has a spring-loaded check valve, which is opened by the pressure in the annular conduit 104 and establishes a communication with the opening chamber 21.

Mode of Operation

If there is a sudden increase in the control pressure in the annular chamber 104 and upstream of the damping nozzle 125, an opening of the prestressing valve 130 occurs. The control oil thus flows fast and directly into the opening chamber 21. A rapid reaction of the opening element is effected, in the direction of opening the load-holding brake valve to lower the load.

While the metering valve in normal operation of the load-holding and brake valve already enables fast triggering, the prestressing valve thus used in combination with it enables a still more-accelerated triggering, bypassing the fast-control region in the fine-control region.

It should be noted that the metering valve may be employed either by itself or in combination with one or more of the elements a, b and c, and can also be used for other control tasks in which it is important for a control piston, by which a hydraulic flow is controlled, to be hydraulically triggered and adjusted by a control pressure, especially being adjusted counter to the force of a restoring spring.

LIST OF REFERENCE NUMERALS

1 Valve housing
1A Load-holding brake valve
2 Control chamber
3 Main piston
4 Sealing face
5 Valve seat
6 Pilot valve seat
7 Sealing face
8 Pilot piston
9 Pilot tappet, piston shank
9A Extension
10 Throttle groove
11 Spring plate
12 Spring
12A Spring
13 Control chamber plug
14 Compensation throttle
15 Spring chamber, pilot chamber
16 Opening shank, thin portion
17 Dividing rib
18 Seal
19 Opening shank, thick portion
20 Opening piston
21 Opening chamber
22 Plug
23 Middle collar
24 Opening spring
25 Lowering line
26 Consumer
27 Return line
28 Inflow line
29 Control line
30 Pressure limiting valve
31 Multiway valve
32 Pump
33 Tank
34 Pilot conduit, seat bore
35 Undercut groove
36 Throttle restriction
37 Guide shank
38 Guide bore
39 End face
40 Antechamber
41 Prethrottle bore, prethrottle
42 End collar

43 Control bore, spring chamber
44 End face
45 End face
46 Spring
47 Spring
48 Stop face
49 Overload bore
50 Blind bore
51 Plug
52 Inner bore
53 Radial bore
54 Check valve seat
55 Pressure limiting piston
56 Sealing face
57 Compression spring
58 Piston extension
59 Bore bottom
60 Return bore
61 Seal
62 End collar
63 End collar
64 End face
65 End face
66 Compression spring
67 Plug
68 Bore
69 Relief bore
70 Annular chamber
71 Stepped bore
72 Step
73 Return chamber
74 Guide bore
75 End face
76 Turned groove
77 Guide bore
78 Turned groove
79 Seal
80 Radial duct
81 Relief conduit
82 Seal
83 Check nut
84 Metering valve
101 Cap
102 Longitudinal bore
103 Guide step
104 Connecting step
105 Thread
106 Adjusting spindle
107 Valve opening conduit
108 Central conduit
109 Valve seat
110 Closing element
111 Spring
112 Plug
113 Check sealing nut
114 Radial conduit
115 Control connection
116 Filter
117 Nozzle
118 Shank
119 Closing piston
120 Seal (O-ring)
121 Seal (O-ring)
125 Damping nozzle
126 Connecting bore, bore
127 Connecting bore, damping conduit
128 Damping nozzle
129 Connecting bore, prestressing conduit
130 Prestressing valve
131 Connecting conduit, prestressing conduit
132 Bypass nozzle
133 Valve ball of the bypass check valve
134 Spring of the bypass check valve
135 Bypass conduit, bore
136 Seal (O-ring)
137 Bypass conduit
138 Tank conduit, connecting bore
141 Undercut groove
142 Region of greatest cross section
143 Region of decreasing throttling (throttling action)
144 Partial length of decreasing cross section
145 Partial length of constant cross section
146 Region of least cross section
147 End chamber

What is claimed is:

1. A hydraulically controllable load-holding brake valve, in particular for a double-acting consumer, which on one end, its load end, is subject to an external load, having the following characteristics:

a control chamber (2) is disposed in a valve housing (1);

the control chamber comprises chamber segments, preferably arranged in alignment, specifically in this order:

pilot chamber (15);

annular chamber (70), which communicates via connection B with the lowering line (25) of the consumer (26);

return chamber (73), which communicates via connection A with the return line (27) to the tank;

opening chamber (21), which communicates with a control conduit (X); between the annular chamber and the return chamber, a valve seat (5) with a central opening is disposed in the control chamber (2) in stationary fashion on the valve housing (1), by way of which opening the connection bores A and B can be connected;

the valve seat is closed and opened by a main piston (3);

the main piston (3) is embodied as a stepped piston and has the following:

a thin piston collar, which with the cylindrical wall of the control chamber (2) forms the annular chamber (70), a sealing face (4) on the thin piston collar, which is oriented toward the valve seat and cooperates with the valve seat (5), a thick piston collar which is guided sealingly on the wall of the control chamber between the annular chamber and the pilot chamber and divides the two from one another;

the main piston is axially displaceable in the control chamber (2) by means of pressure imposition on the return chamber (73) or the annular chamber (70) in the direction of lifting away from the valve seat (4) and by means of pressure imposition on the pilot chamber (15) in the direction of closure of the valve seat;

the pilot chamber (15) can be connected via a compensation throttle (14) to both the annular chamber (70) and connection B and, via a pilot conduit (34) having a pilot valve seat (6) in the main piston (3), with the return chamber (73) and connection A;

the pilot conduit with the pilot valve seat (6) is closeable by means of a closing element, the pilot piston 8, guided concentrically to the pilot conduit (34), with its sealing face (7) by means of pressure imposition in the pilot chamber (15) and preferably the force of a closing spring (12) and can be opened in the opposite direction by a pilot tappet (9), which pilot tappet (9) is guided with play in the pilot conduit (34) and protrudes into the return chamber (73);

an opening piston (20) is axially guided in the opening chamber (21) and is displaceable in the direction of the return chamber (73) by pressure imposition on the opening chamber (21) and in the opposite direction by an opening spring (24);

the opening piston (20) has an opening shank (19), oriented counter to and coaxially with the pilot tappet (9), which shank protrudes with one end, the opening end (16), into the control chamber (2) and upon axial displacement of the opening piston (20) counter to the force of the opening spring (24) acts upon the pilot tappet (9) and the pilot piston (8) in the direction of opening, characterized in that the pilot tappet (9), over its length and beginning at the seat face (7) of the pilot piston (9), has at least the following longitudinal regions:

first, a region (142) of maximal cross section, which is guided with minimal play (throttle gap) relative to the pilot conduit (34), then an adjoining throttling region (143), which over its length, with its cross section, forms a throttle gap relative to the pilot conduit (34), which gap begins at the throttle gap of the maximal cross section and then increases steadily, preferably progressively, at least over a partial length (144) of the throttling region (143);

then a region (146) of minimal cross section;

that preferably the pilot tappet (9) is firmly connected to the pilot piston (8);

that the active area (45), acted upon by the control pressure, of the opening piston (20) is in a ratio to the active area of the pilot valve seat (6) of greater than 50:1, preferably greater than 100:1, and that preferably the ratio of the end face (45) of the opening piston (20) to the end face (44) or active area (74) on the opening end (16) is greater than 30:1 and in particular greater than 60:1;

that the throttle cross section (throttle restriction 36), which the pilot tappet (9) forms with the pilot conduit (34), is smaller in all the opening positions of the pilot piston (8) than the opening cross section formed between the pilot valve seat (6) and the sealing face (7) of the pilot piston (8); and that the maximal throttle cross section that the pilot piston (8) forms with the pilot conduit (34) is larger than the flow cross section of the compensation throttle (14).

2. The valve of claim 1, characterized in that the pilot tappet (9), in the throttling region closest to the pilot piston (region 142 of maximal cross section), is embodied as circular-cylindrical and substantially having the maximal cross section and only slight play relative to the pilot conduit (34);

that the pilot tappet (9) in the then following throttling region (143) of decreasing throttling action has at least one axially oriented throttle groove (10) on its jacket, the depth and/or width of which groove adjoins the region of maximal cross section essentially at zero and increases steadily over a partial length (144) of the throttling region (143), and—preferably—then continues constant over a further partial length (145), and—preferably—that the groove bottom of the throttle grooves on the other end of the throttling region (143) terminates essentially at the minimal cross section of the pilot tappet (9).

3. The valve of one of claim 1, characterized in that the main piston (3), on its end toward the pilot chamber (15), has a central guide bore (38), from the bottom of which the pilot conduit (34) originates;

the pilot piston (8), on the (spring-loaded) end toward the pilot chamber, has a guide shank (37), which is sealingly guided in a guide bore (38) in the main piston (3) and has an end face (39) larger in area than the active area of the pilot valve seat (6);

the part of the guide bore (38) that is located between the pilot valve seat (6) and the guide shank (37) communicates with the pilot chamber (15) via a prethrottle bore (41).

4. The valve of one of claim 1, characterized in that the annular chamber (70) including connection B and lowering line 25 and the return chamber (60) with the return chamber (73) including connection A, return line (27) and tank, communicate via a chamber (49) and a return chamber (60) and a spring-loaded pressure limiting piston (55), disposed between them, of a pressure limiting valve (30).

5. The valve of claim 4, characterized in that the chamber (49) and the return chamber (60) are located between two end chambers of the pressure limiting valve (30);

that the spring-loaded pressure limiting piston (55) of the pressure limiting valve (30) has both a sealing face (56) and one piston shank on each of both ends, with a guide end (62) and a guide end (63), wherein the sealing face (56) is subject to the prestressing force of a compression spring (57) at the valve seat (54), and wherein each guide end (62, 63) is sealingly guided in one of the end chambers of the valve housing (1);

that the end chamber, which is adjacent to the overload bore (49), and its guide end (62) are loaded by the pressure of the return chamber (73) via the longitudinal bore (81) and traverse bore (80) and are slightly smaller in cross section (end face 64) than the seat face area of the valve seat; and that the end chamber having the guide end (63) is pressure-relieved and is equal in size, in terms of its hydraulically active cross section (end face 65), to the difference between the valve seat face (54) and the cross section (end face 64) of the end chamber (147) with its guide end (62).

6. The valve of claim 4, characterized in that the spring-loaded pressure limiting piston (55) of the pressure limiting valve (30) is loaded by two parallel-connected compression springs, of which one compression spring (57) is fastened in the return chamber (60) counter to the pressure limiting piston (58), and the other compression spring (66) is fastened in the pressure-relieved end chamber counter to the piston shank with the guide end (63).

7. The valve of one of claim 1, characterized in that the opening chamber (21) communicates with the control conduit (X) via a metering valve (84), by which the opening piston (20) is acted upon by a quantity of control oil that is limited to a predetermined stroke of the opening piston (20).

8. The valve of claim 7, characterized in that the metering chamber (102) of the metering valve (84) communicates with the control connection (115) and has the following:

a valve opening (107) with a valve seat (109), through which the control oil reaches the opening chamber (21);

a closing element (110), which is braced by means of a shank (118) on the opening piston (20) in such a way that the closing element (110) is movable in the metering chamber (102), between the valve seat (109) and an opening position, in synchronism with the opening piston (20), and that it closes the valve seat (109) at a predetermined stroke of the opening piston (20).

9. The valve of claim 8, characterized in that the valve opening (107) in the opening chamber (21) opens out on the side remote from the opening spring (147) and is surrounded by an annular closing face (valve seat 109), which is located parallel to the pressure-impinged face end of the opening piston;

the shank (118) penetrates the valve opening (107) with great play; the closing element (110) is pressed by a spring (111) so that the shank contacts the pressure-impinged face end of the opening piston (20) and, after the execution of the predetermined stroke, is pressed against the valve seat (109).

10. The valve of claim 9, characterized in that the valve seat (109) with the valve opening (107) of the metering valve (84) is movably guided and positionable relative to the opening chamber (21), and in particular the valve opening (107) of the metering valve (84) is formed on a closing piston (119) which closes the metering valve chamber (102) off from the opening chamber (21) and which is sealingly guided and positionable in the metering valve chamber (102) parallel to the opening piston (20).

11. The valve of claim 10, characterized in that the closing piston (119) is positionable such that it strikes the opening piston (20) and displaces and positions the opening piston (20) in the direction of unlocking the pilot closing element (pilot piston 8).

12. The valve of claim 10, characterized in that the closing piston (119) is mounted on the free end of an adjusting spindle (106);

the adjusting spindle (106) has a central conduit (108), which is aligned with the valve opening (107) and is closed on the free end of the adjusting spindle (106) by the plug (112);

the closing element (ball 110) is guided in the central conduit (108);

the central conduit (108) is acted upon by the control pressure on both sides of the closing element; and the adjusting spindle (106) can be screwed into or unscrewed out of a threaded bore (105) that is parallel to the motion of the opening piston (20).

13. The valve of claim 12, characterized in that in the one terminal position of the adjusting spindle (106), the closing piston (119) protrudes into the opening chamber (21), strikes the opening piston, and displaces the opening piston (20) in the direction of unlocking the pilot closing element (pilot piston 8) (FIG. 8), and in the other terminal position, the spacing of the valve seat (109) from the end face of the opening piston (20), which is in its position of repose, is shorter than the shank (118).

14. The valve of claim 12, characterized in that the central conduit (108) is acted upon on both sides of the closing element (110) by the control pressure, in that the control pressure conduit (114) opens out into the central conduit (108) immediately upstream of the closing face of the closing piston, and the closing element is guided with play in the central conduit.

15. The valve of claim 7, characterized in that the shank (118) is permanently connected to the closing element (110) or is separate from the closing element (110);

the shank (118) is permanently connected to the opening piston (20) or is separate from the opening piston (20).

16. The valve of one of claim 7, characterized in that the metering valve (84) is bypassed by a throttling conduit (127), which after the closure of the seat (109) by the closing element (110) exhibits increased throttling (throttles or baffles 125 and 128) of the stream of control oil.

17. The valve of one of claim 7, characterized in that the metering valve is bypassed by a prestressing conduit (129, 131) with a prestressing valve (130) placed in it, with which the maximal pressure difference between the prestressing conduit (129) and the connecting conduit (131) is predetermined.

18. The valve of one of claim 7, characterized in that the metering valve is bypassed by a relief conduit, such as bypass conduits (135, 137), which connects the control conduit with the tank via a bypass nozzle (132) and a check valve (133).

* * * * *